US006772148B2

(12) United States Patent
Baclawski

(10) Patent No.: US 6,772,148 B2
(45) Date of Patent: *Aug. 3, 2004

(54) CLASSIFICATION OF INFORMATION SOURCES USING GRAPHIC STRUCTURES

(75) Inventor: Kenneth P. Baclawski, Waltham, MA (US)

(73) Assignee: Jarg Corporation, Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/365,276

(22) Filed: Feb. 12, 2003

(65) Prior Publication Data

US 2003/0120681 A1 Jun. 26, 2003

Related U.S. Application Data

(63) Continuation of application No. 09/677,912, filed on Oct. 3, 2000.
(60) Provisional application No. 60/157,540, filed on Oct. 4, 1999.

(51) Int. Cl.[7] .......................... G06F 17/30; G06T 11/20
(52) U.S. Cl. .......................... 707/3; 345/440; 345/853; 345/854
(58) Field of Search ........................ 707/5, 10, 100–102, 707/200, 205; 345/587, 530, 440.2, 853–854; 706/45, 47

(56) References Cited

U.S. PATENT DOCUMENTS

| 4,964,063 A | 10/1990 | Esch |
| 5,309,359 A | 5/1994 | Katz et al. |

(List continued on next page.)

FOREIGN PATENT DOCUMENTS

| EP | 0 822 503 A1 | 2/1998 |
| WO | WO 01/29709 A1 | 4/2001 |

OTHER PUBLICATIONS

Salton, Gerard et al., "Automatic Structuring And Retrieval Of Large Text Files", Communications Of The ACM, Feb. 1994, pp. 97–108, vol. 37, No. 2.

(List continued on next page.)

Primary Examiner—Alford Kindred
(74) Attorney, Agent, or Firm—Kudirka & Jobse LLP

(57) ABSTRACT

In a knowledge classification system, both the information sources and queries are processed to generate knowledge representation graph structures. The graph structures for both the query and the information sources are then converted to views and displayed to a searcher. By manipulating the graph structure views for each information source, the searcher can examine the source for relevance. A search can be performed by comparing the graph structure of the query to the graph structure of each information source by a graph matching computer algorithm. Information sources are classified by constructing hierarchies of knowledge representations. The simplest construction is obtained by using the knowledge representation of a query as the top of the hierarchy. The structures in the hierarchy are substructures of the query. The hierarchy of structures may also be constructed by using the knowledge representation of the query as the bottom of the hierarchy. Structures in the hierarchy, in this case, are structures that contain the query. The vertices of a graph structure view can be displayed on a computer screen next to the corresponding items, such as words, phrases and visual features, of an information source view. Selecting a vertex in the graph structure causes the selected vertex and vertices adjacent to the selected vertex to be "highlighted." By selecting a succession of vertices in the graph structure, a searcher can perform knowledge navigation of the information source. By successively selecting items of the information source, a searcher can perform knowledge exploration of the information source.

12 Claims, 20 Drawing Sheets

U.S. PATENT DOCUMENTS

| | | | |
|---|---|---|---|
| 5,647,058 A | | 7/1997 | Agrawal et al. |
| 5,655,080 A | | 8/1997 | Dias et al. |
| 5,694,593 A | | 12/1997 | Baclawski |
| 5,768,578 A | * | 6/1998 | Kirk et al. .................. 707/100 |
| 5,926,551 A | | 7/1999 | Dwork et al. |
| 5,931,907 A | | 8/1999 | Davies et al. |
| 5,953,726 A | | 9/1999 | Carter et al. |
| 6,006,217 A | | 12/1999 | Lumsden |
| 6,076,088 A | | 6/2000 | Paik et al. |

OTHER PUBLICATIONS

Chakrabarti, Soumen, et al., "Automatic Resource Compilation by Analyzing Hyperlink Structure and Associated Text", Proceedings 7th International World Wide Web Conference, 1998, <http://decweb.ethz.ch/WWW7/1898/com1898.htm>.

Jain, Ranesh, "Content–Centric Computing in Visual Systems", in Del Bimbo, Alberto, "Image Analysis and Processing", Lecture Notes in Computer Science, 9th International Conference ICIAP '97, Sep., 1997, pp. 1–31, Proceedings, vol. II, Florence, Italy.

Pirolli, Peter et al., "Silk from a Sow's Ear: Extracting Usuable Structures From the Web", CHI 96, Apr. 13–18, 1996, pp. 118–125, Vancouver, Canada.

Kleinberg, Jon, "Authoritative Sources in Hyperlinked Environment", Proceedings 9th ACM–SIAM Symposium on Discrete Algorithms, 1998, <http://www.cs.cornell.edu/home/kleinber/auth.pdf>.

Gibson, David et al, "Inferring Web Communities from Link Topology", Proceedings 9th ACM Conference on Hypertext and Hypermedia, 1998, <http://www.cs.cornell.edu/home/kleinber/ht98.pdf>.

Arocena, Gustavo et al., "Applications of a Web Query Language", HYPER Proceedings, Sixth International World Web Conference, LaTeX2 translator Version 96.1, (Feb. 5, 1996), Nikos Drakos, Computer Based Learning Unit, University of Leeds.

Weiss, Ron et al., "HyPursuit: A Hierarchical Network Search Engine That Exploits Content–Link Hypertext Clustering", Hypertext '96, pp. 180–193, Washington, DC, USA.

Rivlin,Ehud et al., "Navigating in Hyperspace: Designing a Structure–Based Toolbox", Communications Of The ACM, pp. 87–97, Feb. 1994, vol. 37, No. 2.

Tversky, Amos et al., "Features of Similarity", Psychological Review, The American Psychological Association, Inc., Jul. 1977, pp. 327–352, vol. 84, No. 4.

White, Howard, "Bibliometrics", Annual Review of Information Science and Technology, pp. 119–186, vol. 24, 1989, Elsevier Science Publishers B.V.

Spertus,Ellen, "ParaSite: Mining Structural Information on the Web", HYPER Proceedings, Sixth International World Wide Conference, <http://decweb.ethz.ch/WWW6/Technical/Paper206/Paper206.html>.

Noy, Natalya Fridman, "Knowledge Representation for Intelligent Information Retrieval in Experimental Sciences", Ph.D. Thesis, Northeastern University, Dec. 1997, pp. 2–67.

Rivest,R., "The MD4 Message Digest Algorithm", Request for Comments: 1186, MIT Laboratory for Computer Science, pp. 1–18, Oct. 1990.

Ohta,Yuichi,"Knowledge–Based Inerpretation of Outdoor Natural Color Scenes", Institute of Information Sciences and Electronics, University of Tsukuba, pp. 1–90, Ibaraki 305, Japan.

Fikes, Richard, "Ontologies: What are They, and Where's The Research?", KR'96, Proceedings of the Fifth International Conference, Nov. 5–8, 1996, pp. 652–664.

Santini, Simone, et al., "Image Databases Are Not Databases With Images", in Delbimbo, Alberto, "Image Analysis and Processing", Lecture Notes in Computer Science, 9th Inernational Conference ICIAP '97, Sep. 1997, pp. 38–45, 356–427, Proceedings, vol. II, Florence, Italy.

Salton, Gerard, "Automatic Indexing", Automatic Text Processing: The Transformation, Analysis, and Retraval of Information by Computer, 1989, pp. 275–366, Addison–Wesley Publishing Co.

Hurwicz, Mike, "Take Your Data to the Cleaners", Byte Magazine, CMP Media Inc., Jan., 1997, <http://www.byte.com>.

Weldon, Jay–Louise, et al., "Data Warehouse Building Blocks", Byte Magazine, CMP Media Inc., Jan., 1997, <http://www.byte.com>.

Weiss, Sholom, et al., "What Is Data Mining?", Predictive Data Mining, A Practical Guide, Morgan Kaufmann Publishers, Inc., 1998, pp. 1–58.

Zloof, Moshe M., "Query–By–Example: The Invocation and Definition of Tables and Forms", IBM Thomas J. Watson Research Center, Yorktown Heights, NY.

Wooldridge, Michael, et al., "Intelligent Agents: Theory and Practice", The Knowledge Engineering Review, vol. 10:2, 1995, 115–152.

Campbell, Alistair E., et al., "Algorithms for Ontologiecal Mediation", Department of Computer Science and Center for Cognitive Science, State University of New York at Buffalo, Buffalo, NY.

Baclawski, Kenneth, "An Abstract Model For Semantically Rich Information Retrieval", Northeastern University, College of Computer Science, Boston, MA Mar. 30, 1994.

Giger, H.P., "Concept Based Retrieval in Classical IR Systems", Proceedings of the International Conference on Research and Development in Information Retrieval, NY, NY, ACM, vol. CONF. 11, p. 275–289.

Santini, et al.; "Similarity Queries In Image Databases"; Proceedings 1996 IEEE Computer Society Conference on Computer Vision and Pattern Recogniation (Cat. No. 96CB35909), Proceedings of IEEE Conference on Computer Vision and Pattern Recognition, San Francisco, CA, USA; Jun. 18–20, 1996; pp. 646–651; XP002127209; 1996, Los Alamitos, CA, USA, IEEE Computer Society Press, USA ISBN: 0–8186–7258–7 *Section 2.1.2*.

Zhang, Kaizhong, et al., "On the Editing Distance Between Undirected Acyclic Graphs and Related Problems", International Journal of Foundations of Computer Science, pp. 43–56, (1996), vol. 7(1)/.

Ounis, Iadh, et al., "A Promising Retrieval Algorithm For Systems Based on the Conceptual Graphs Formalism", Database Engineering and Applications Symposium, 1998, Proceedings. Ideas 1998, International Cardiff, UK, Jul. 8–10, 1998, Los Alamitos, CA, USA, IEEE Cumputer Society, US.

Mechkour, M., et al,. "PRICE–GC. A Medial Information Retrieval Prototype on the WEB", Proceedings. 7th International Workshop on Research Issues in Data Engineering. High Performance Database Management for Large–Scale Applications, Proceedings 7th International Workshop on Research Issues in Data Engineer, pp. 2–9, 1997, Los Alamitos, Ca, USA, IEEE Computer Society Press, USA.

* cited by examiner

FIG. 16

CLASSIFICATION OF INFORMATION SOURCES USING GRAPHIC STRUCTURES

RELATED APPLICATIONS

This application is a continuation of Ser. No. 09/677,912 filed on Oct. 3, 2000 and related to, and claims priority of, U.S. provisional application serial No. 60/157,540, filed on Oct. 4, 1999 by Kenneth P. Baclawski.

FIELD OF THE INVENTION

The invention relates to methods and apparatus for the classification of information sources and the display of information to a user.

BACKGROUND OF THE INVENTION

The increasing popularity of high-speed computer networking has made large amounts of data available to individuals. Methods used in the past for dealing with information were adequate when the amount of information was small, but they do not scale up to handle the enormous amount of information that is now easily accessible.

Research is a fundamental activity of knowledge workers, whether they are scientists, engineers or business executives. While each discipline may have its own interpretation of research, the primary meaning of the word is a "careful and thorough search." In most cases, the thing one is searching for is information. In other words, one of the most important activities of modern educated individuals is searching for information. Whole industries have arisen to meet the need for thorough searching. These include libraries, newspapers, magazines, abstracting services and online search services.

Not surprisingly, the search process itself has been studied at least since the 1930s, and a standard model was developed by the mid-1960s. In this model, the searcher has an "information need" which the searcher tries to satisfy using a large collection or "corpus" of information sources. The information sources that satisfy the searcher's needs are the "relevant" information sources. The searcher expresses an information need using a formal statement called a "query." Queries may be expressed using topics, categories and/or words. The query is then given to a search intermediary. In the past, the intermediary was a person who specialized in searching. It is more common today for the intermediary to be a computer system. Such systems are called information retrieval systems or online search engines. The search intermediary tries to match the topics, categories and/or words from the query with information sources in the corpus. The intermediary responds with a set of information sources that, so it is hoped, satisfies the searcher's needs.

Also, in accordance with the standard model, another very commonly used technique to find information in a corpus is to start with a document and then follow citations or references within the document to find other documents in the corpus. References in these documents are then used to find further documents. This technique is called "browsing" and online browsing tools are now becoming very popular. Such tools allow a searcher to quickly follow references contained in information sources, often by simply "clicking" on a word or picture within the information source. In the standard model for information retrieval, a sharp distinction is made between searching using queries and searching using references.

Computerized search engines have been developed to assist in information retrieval. Some are primarily based on matching words in a query with words in text documents. In practice, this means that this type of search engine cannot search effectively for features of images and other kinds of multimedia. Non-word based techniques currently employ approaches to extracting relevant information that are different and distinct from those used in word based systems and generally involve extracting data "features" from the raw data. Features of images, sound and video streams can be represented in a computer system as a set of data structures stored in a database.

Features can be as simple as the value of an attribute such as brightness of an image, but many features are more complicated and are thus represented using a complex data structure. Typically, features can be extracted from structured documents by parsing the document to produce data structures, and can be extracted from unstructured documents by using one of the many feature extraction algorithms that have been developed for implementation on a computer. As in the case of structured documents, feature extraction from an unstructured document produces data structures.

A large variety of feature extraction algorithms has been developed for media such as sound, images and video streams. For a discussion of such algorithms, see *The Ninth International Conference on Image Analysis and Processing*, A. Del Bimbo, editor, v. 1311, Springer Verlag and Company, September 1997, which is incorporated in its entirety by reference.

The data structures that represent features typically conform to a "data model" for the database that determines the kinds of components and attribute values that are allowed. Each feature can have one or more values associated with components of the data structure that represents the feature. In the simplest case, the data structure can have a single component with an associated value, and the feature can be represented by one attribute of the object. Features that are more complex can be represented by several inter-related components, each of which may have attribute values. The data model for features at the domain level is often called an "ontology." An ontology models knowledge within a particular domain, such as, for example, medicine. An ontology can include a concept network, specialized vocabulary, syntactic forms and inference rules. In particular, an ontology specifies the features that objects can possess as well as how to extract features from objects. When the extracted features are represented as a computer data structure, the data structure is called a "knowledge representation" of the information source.

In the standard model, the quality of a search is measured using two numbers. The first number represents how thorough the search was. It is the fraction of the total number of relevant information sources that are presented to the searcher. This number is called the "recall." If the recall is less than 100%, then some relevant information sources have been missed. The second number represents the fraction of the total number of information sources that are presented to the searcher that are judged to be relevant. This number is called the "precision." If the precision is less than 100%, then some irrelevant information sources were presented to the searcher.

The recall can always be increased by adding many more information sources to those already presented, which can decrease the precision. Similarly, the precision can be increased by reducing the number of references retrieved and presented to the searcher, which can decrease the recall. Ideally, the recall and precision should be balanced so as to achieve a search that is as careful and thorough as possible.

However, typical online search engines can achieve only about 60% recall and 40% precision. Surprisingly, these performance rates have not changed significantly in the last 20 years.

The standard model for information retrieval uses recall and precision as measures of "relevance." Relevance is a central concept in human (as opposed to computer) communication. This was recognized already in the 1940s when information science was first being formed as a discipline. The first formal in-depth discussion of relevance occurred in 1959, and the topic was discussed intensively during the 1960s and early 1970s. As a result of such discussions, researchers began to study relevance from a human perspective. The two best-known studies were by Cuadra and Katter and by Rees and Schultz, both of which appeared in 1967. The main conclusions of these studies are that the recall and precision rates used in the standard model for information retrieval do not accurately represent how people perceive relevance. People perceive an information source to be relevant if it extends their knowledge and, thus, relevance is determined by the difference between what is known and what is yet to be known. For example, if a search uncovers an information source that is already known to a searcher, the searcher will consider the source to be redundant rather than relevant. However, in accordance with the standard model for information retrieval, such a source would be considered perfectly relevant.

Therefore, there is a need for a search tool that improves the recall and precision of searches and also produces results that are perceived as relevant by the searcher.

SUMMARY OF THE INVENTION

In accordance with one embodiment, both the information sources and queries are processed to generate knowledge representations that consist of graph structures. The knowledge representation graph structures are converted into graph structure views and the graph structure views for both the query and the information sources are then displayed to a searcher. By manipulating the graph structure views for each information source, the searcher can examine the source for relevance.

In accordance with another embodiment, available information sources are classified by comparing the knowledge representation of a query with the knowledge representations of the information sources by matching the graph structures with graph matching algorithms. Those information sources that have a substructure that matches the query in full, or in part, are classified by the largest matching substructure of the query. Thus, it is possible for a searcher to request the "next occurrence" of a knowledge representation graph structure in an information source. In this case, the computer system searches the current information source knowledge representation for another substructure that matches the query graph structure occurring at a subsequent point in the information source. Similarly, requesting a "previous occurrence" causes the system to search for a matching substructure occurring at a previous point in the information source.

In still another embodiment, information sources are classified by constructing hierarchies of knowledge representations. The simplest construction is obtained by using the knowledge representation of a query as the top of the hierarchy. The structures in the hierarchy are then substructures of the query. The hierarchy of structures may also be constructed by using the knowledge representation of the query as the bottom of the hierarchy. Structures in the hierarchy, in this case, are structures that contain the query. Views of this hierarchy can be displayed to a searcher with a substructure view being displayed adjacent to the information source from which it was derived.

In accordance with yet another embodiment, the graph structure corresponding to a knowledge representation consists of vertices joined by directed edges. Each vertex represents a concept that can be visually portrayed as a word, phase and/or icon. A vertex may also contain a category that is visually portrayed either textually or by a distinct shape, color and/or icon. An edge may be labeled by an edge type. Different types of edges can be distinguished by using a textual label or by using a distinct shape, color and/or icon. Two vertices that are joined by an edge are called adjacent vertices. The categories, concepts and edge types used to construct the graph structure are specified by an ontology for the knowledge domain.

In accordance with a further embodiment, the vertices of a graph structure view can be displayed on a computer screen next to the corresponding items, such as words, phrases and visual features, of an information source view. Selecting a vertex in the graph structure view causes the selected vertex and vertices adjacent to the selected vertex to be "highlighted." In addition, the corresponding items in the information source view are highlighted. Similarly, selecting a feature in the information source view causes the corresponding vertex in the graph structure to be highlighted. Highlighting can be accomplished by using the same feature (such as the same color or the same location on the screen) for corresponding parts of the two views.

By selecting a succession of vertices in the graph structure view, a searcher can perform knowledge navigation of the information source. By successively selecting items in the information source view, a searcher can perform knowledge exploration of the information source.

BRIEF DESCRIPTION OF THE DRAWINGS

The above and further advantages of the invention may be better understood by referring to the following description in conjunction with the accompanying drawings in which:

FIG. 16 is a screen shot of a sample display illustrating the processing of a query by means of graph structures, which shows how knowledge exploration is initiated.

DETAILED DESCRIPTION

Figure 1:
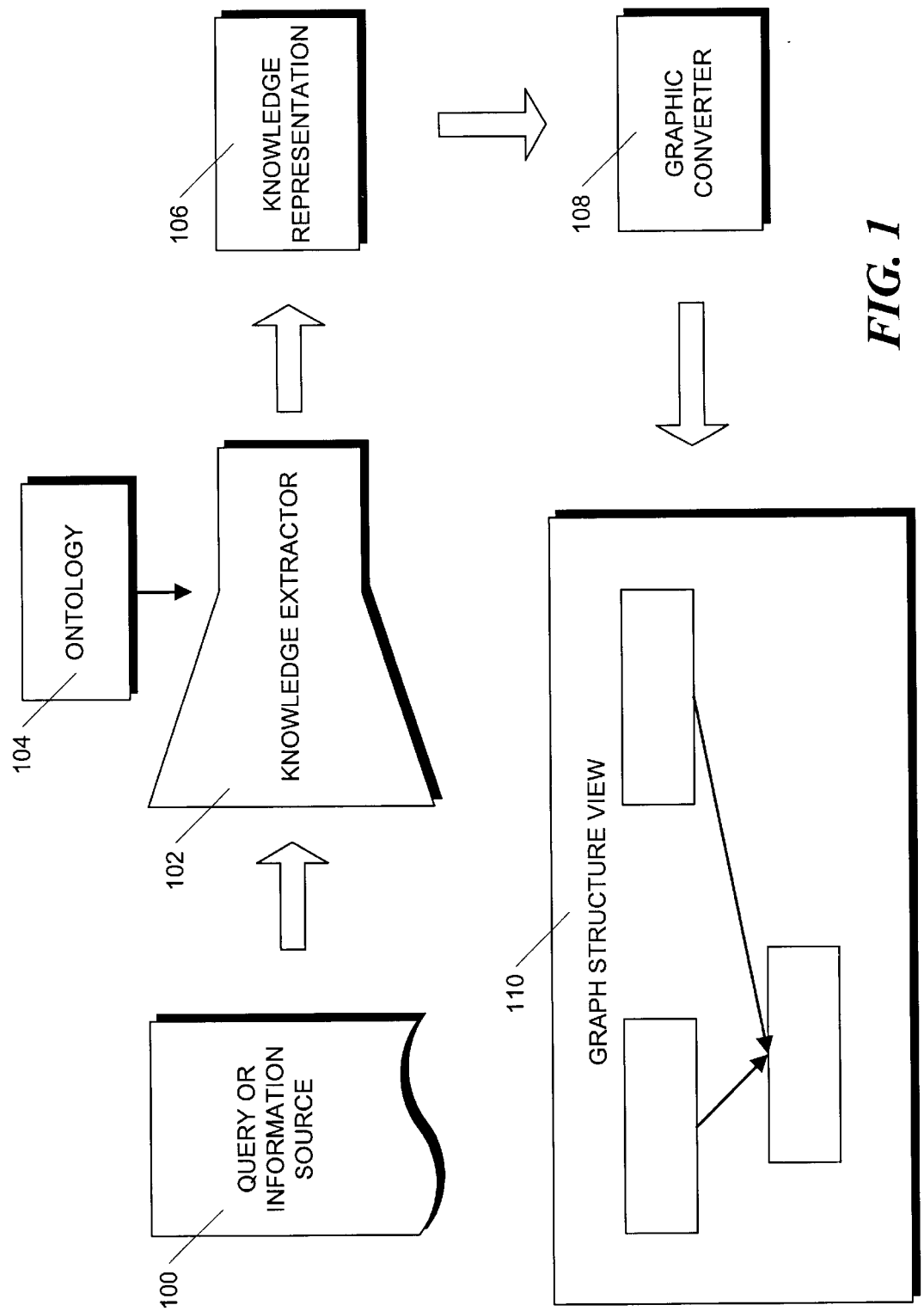
FIG. 1 is a schematic block diagram that illustrates the creation and display of a graph structure from a query or an information source.

FIG. 1 illustrates the basic process by which a query or information source is converted into a graph structure that can then be visually displayed. This process begins when a query or information source 100 is provided to a knowledge extractor 102. The knowledge extractor 102 is a known processor or engine that uses a knowledge extraction algorithm to process the information in the query or information source to generate a knowledge representation of the input. The knowledge extractor 102 may also use an ontology 104 to assist in the knowledge extraction process.

A large variety of knowledge extraction algorithms has been developed for media such as sound, images and video streams. For example, medical images typically use edge detection algorithms to extract the data objects, while domain-specific knowledge is used to classify the data objects as medically significant objects, such as blood vessels, lesions and tumors. Fourier and Wavelet transformations as well as many filtering algorithms are also used for knowledge extraction. For example, wavelet analysis has been used to characterize the texture of a region and to determine a shape (such as a letter) no matter where the shape is located in, or what orientation the shape has, within the image. An example of a knowledge extraction process is described in detail in an article entitled "An Abstract Model for Semantically Rich Information Retrieval", Kenneth P. Baclawski, Northeastern University, Mar. 30, 1994, the disclosure of which is incorporated by reference in its entirety.

The result of the knowledge extraction process is a knowledge representation 106 that, in the aforementioned article, is implemented by a graph structure called a "keynet". The keynet structure is described using the terminology of graph theory from mathematics. In particular, the structure consists of vertices and edges, where each edge connects one vertex to another (possibly the same) vertex. An edge can be labeled to indicate its purpose, and this label is called the relationship represented by the edge. Knowledge representations can also be described in accordance with a standard called the Resource Description Framework (RDF) promulgated by the World Wide Web Consortium (this standard is described at the URL, http://www.w3c.org/RDF.) RDF also uses graph structures to represent knowledge, but the RDF terminology differs from the terminology of graph theory used to describe keynets. In accordance with the RDF standard, vertices are called resources, and an edge is called a statement. The label on an edge is called the property represented by the edge.

The graph structures that represent the knowledge representations conform to an ontological data model that determines the kinds of components and attribute values that are allowed. Many current systems that perform knowledge extraction from information objects use very simple ontologies, but other more complicated systems can be designed.

The keynet graph structure can be converted into a graph structure view by means of a graphic converter 108. The graph structure view is a visual structure that is easy to read. The graphic converter is a simple algorithm that examines each vertex in the keynet and determines whether the directed edges that are connected to the vertex leave the vertex or enter it. The vertices are then rearranged into a more or less hierarchical structure so that vertices with edges that only leave the vertex are located at the top of the structure and vertices with edges that only enter the vertex are located at the bottom. The remaining vertices are located between the top and bottom levels as dictated by the edge connections. Algorithms for performing this rearrangement are well known and an algorithm that is suitable for use with the present invention is described in detail at the Web site located at URL, http://www.cs.rpi.edu/projects/pb/graphdraw.

The resulting graphical structure can then be depicted as a graph structure view 110 that can be displayed in a conventional graphic user interface display. Examples of such displays are illustrated in FIGS. 6–19 that are discussed in detail below.

In accordance with the principles of the invention, graph structure matching can also be used to classify information sources in their order of relevance as perceived by a human searcher. In particular, information sources can be classified according to their relevance to a query by matching the graph structures of the information sources to the graph structure of the query. The classification process is illustrated schematically in FIG. 2 and the steps of the process are shown in the flowchart of FIG. 3. This process starts in step 300 and proceeds to step 302 where a new query 200 is received. In step 304, a determination is made whether the query is acceptable for use with the knowledge extractor 202. In particular, the query must be formulated using the ontology 204 in order for it to operate successfully with the knowledge extractor 202. Thus, a check must be made to ensure that the terms and relationships described by the query are in fact compatible with the ontology 204.

If the query is not acceptable, the process returns to step 302 to receive a new query. Alternatively, if the query is acceptable, the process proceeds to step 306. In step 306, the query may be reformatted in order to make it compatible with the search engine that will later be used to retrieve information source documents from the information source collection or corpus.

Next, in step 308, the knowledge representation embodied by the query is extracted by the knowledge extractor 202. The result is a knowledge representation 206 which, as previously discussed in the preferred embodiment of the invention, is a keynet. The knowledge representation 206 may be presented to the user for editing and modification. Alternatively, the knowledge representation 206 can be generated by the user directly without the knowledge extractor 202.

In either case, after the user confirms the form of the knowledge representation 206 or generates it himself, in step 310, the knowledge representation 206 is provided to a high recall retrieval engine 208. This retrieval engine compares the knowledge representation that corresponds to the query with knowledge representations that have been previously stored for the information sources. Retrieval engines of this type are known and operate by indexing either a single database or distributed databases to retrieve relevant documents. For example, a retrieval engine that is suitable for use with the present invention is disclosed in detail in U.S. Pat. No. 5,694,593, the disclosure of which is hereby incorporated by reference in its entirety.

The retrieval engine produces a plurality of information source knowledge representations 210 and, in step 312, these knowledge representations are presented to a graph matching processor 212 along with the knowledge representation 206 of the query.

In accordance with the principles of the invention, the graph matching processor 212 organizes the collection of information source knowledge representations by their relevance to a human searcher. Thus, by progressing down the ordered list of knowledge representations, the searcher can progress through the information source knowledge representations in order of their relevance. Thus, the resulting search not only has high recall, but also has high precision and relevance. The result is an ordered list of references 214, which, in step 314, are transmitted to the user. The user may then display the list in step 316 as discussed below. The graph matching processor 212 can make use of the ontology 204 to define any appropriate inference rules during the matching process.

The graph matching processor 212 compares the query graph structure with the knowledge representations of each of the information sources and classifies the sources by constructing a hierarchy of graph structures. This hierarchy is an ordered set for which each pair of elements has a least upper bound and a greatest lower bound. The concepts in the hierarchy can be ordered by generality, i.e., a concept A is less than a concept B if A is less general (more specific) than B.

In the case of information source classifications, the hierarchy of structures may be constructed in several ways. The simplest construction is obtained by using the knowledge representation of the query as the top of the hierarchy. The structures in the hierarchy are then substructures of the query. Such structures are called subgraphs of the query. The subgraphs of the query are arranged by containment of one subgraph in another. This construction method is best suited for highly specific queries.

When the query is unspecific, for example, when the query consists of a single, commonly occurring word, a different strategy is employed, because an unspecific query matches far too many information sources for a user to process. In accordance with a preferred embodiment, the strategy for unspecific queries is to classify information sources using structures (called supergraphs) that contain more features than the original query. Supergraphs are constructed by starting with the query and adding new vertices to those already in the supergraph. The vertices are added so that each added vertex is adjacent to another vertex already in the supergraph. In addition, each supergraph must occur in at least one information source as part, or all, of its knowledge representation. The supergraphs of the query are then arranged by containment of one supergraph in another.

In general, the hierarchy of structures is constructed by using both subgraphs and supergraphs of the query. Each information source is classified by the largest structures in the hierarchy that are contained in the knowledge representation of the information source. A single information source can belong to more than one classification.

In this way, the large set of relevant information sources is subclassified into smaller sets of information sources. The user is presented a list of relevant supergraphs and subgraphs rather than a set of information sources. The classifications and subclassifications form the hierarchical structure, called a taxonomy or classification hierarchy.

Figure 4A:
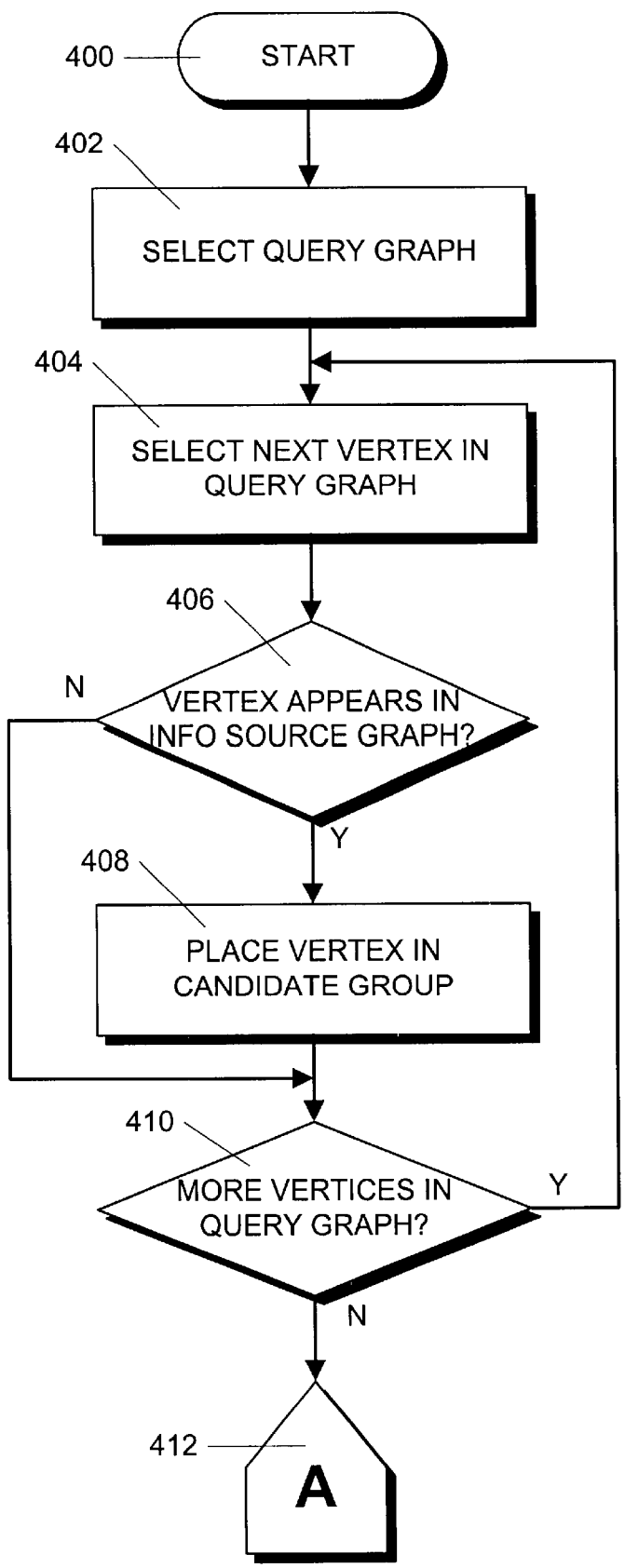
FIGS. 4A and 4B, when placed together, form a flowchart that illustrates a process for matching a query graph structure to an information source graph structure using subgraph structures.
Figure 4B:
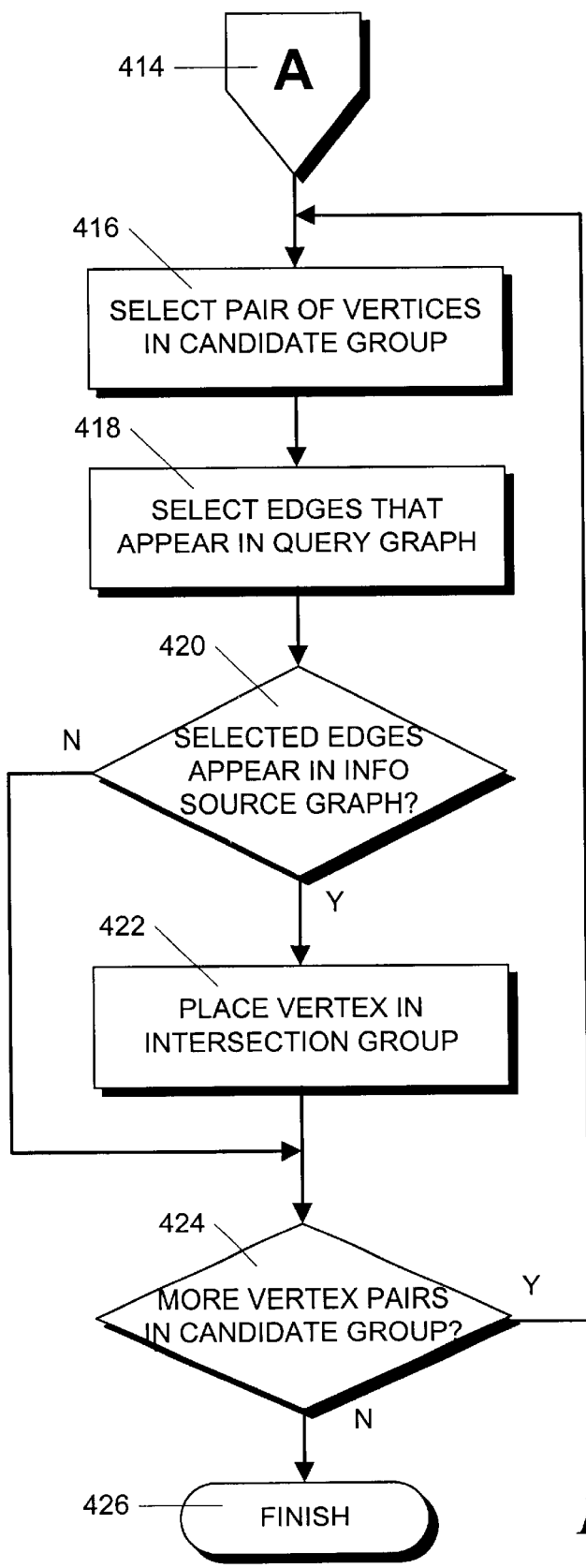

The process of comparing a query to information source documents by graphical analysis of subgraphs is illustrated in FIGS. 4A and 4B, which, when placed together, form a flowchart of the process. This process starts in step 400 and proceeds to step 402 in which a graph structure corresponding to the query knowledge representation is selected. The process then proceeds to step 404 where a vertex is selected in the query graph structure. In step 406, the graph structure of the information source is examined to determine whether the same vertex appears in the information source graph structure. If the vertex does not appear in the information source graph structure, as determined in step 406, then the process proceeds to step 410 in which the query graph structure is examined to determine whether more vertices are present that have not yet been processed. If there are more vertices present, the process proceeds back to step 404 and the next vertex in the query graph structure is selected for processing.

Alternatively, if in step 406, it is determined that a selected vertex in a query graph structure appears in the information source graph structure, then the routine proceeds to step 405 where information identifying the selected vertex and the corresponding information source vertex are placed in a candidate group of vertices. This information might consist, for example, of information identifying the concept and associated edges in the query graph structure and information identifying the location and content of the document features that constitute the vertices in the information source document. The process then proceeds to step 410 to determine whether more unprocessed vertices are present. If so, the process then returns to step 404 where the next unprocessed vertex is selected from the query graph structure.

Operation continues in this manner until there are no more vertices to be selected in the query graph structure. The process then proceeds, via off-page connectors 412 and 414, to step 416 in which the candidate vertex group is examined to find vertices that have corresponding edges in the query graph structure and information source graph structure. In particular, in step 416, one of the pair of vertices previously identified from the query and information source graph structures are selected in the candidate group.

Then, in step 418, the edges that appear in the query graph structure are examined. Each edge is compared to the edges in the corresponding vertex in the information source graph structure. This comparison is made in step 420. If the selected edges do not appear in the information source graph structure, then the process proceeds to step 424 in which the candidate group is examined to determine whether any vertex pairs remain that have not been processed. If so, the routine proceeds back to step 416 when the next pair of vertices in the candidate group is selected.

Alternatively, if in step 420, the selected edges appear in the information source graph structure, then the information identifying the pair of vertexes in the candidate group is placed into an intersection group in step 422. The process then proceeds to step 424 to determine if any additional vertex pairs remain. If so, the process consisting of steps 416, 418, 420 and 422 is repeated. If not, the process finishes in step 426. The result of this process is a subgraph structure of a knowledge representation that appears in the information source document that matches the query source graph structure.

Figure 5:
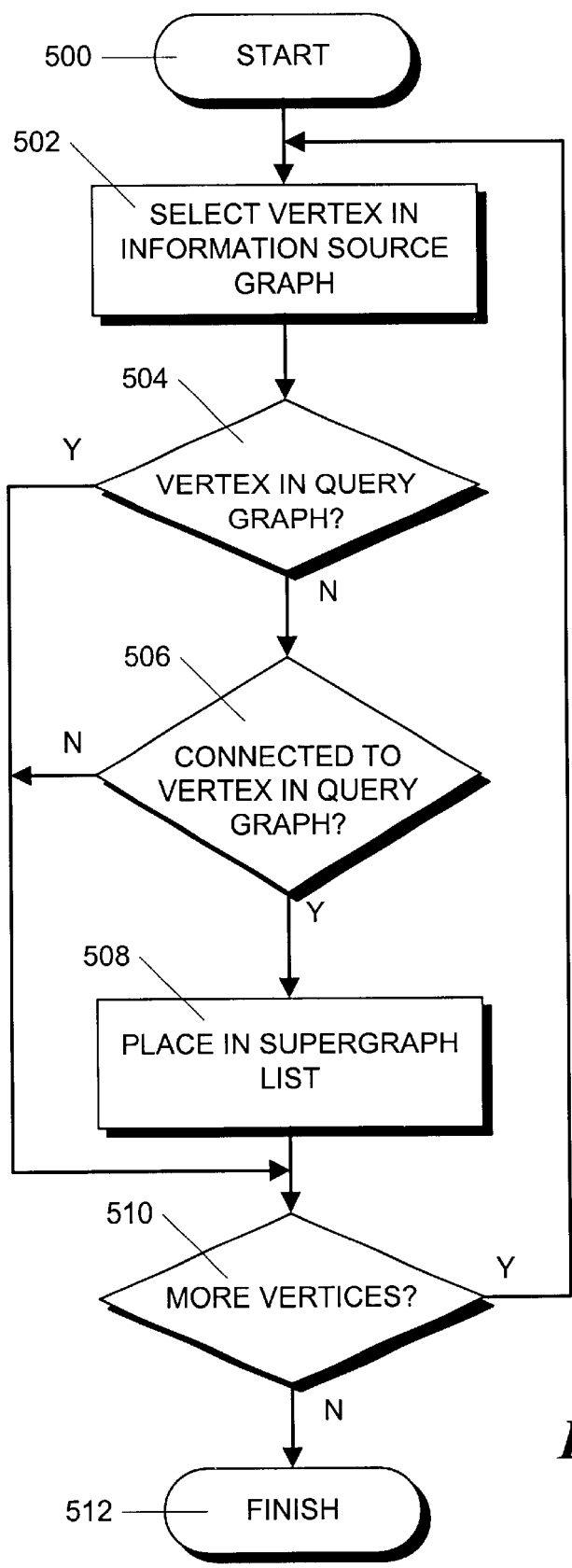
FIG. 5 is a flowchart that illustrates a process for matching a query graph structure to an information source graph structure using supergraph structures.

In a similar manner, the process illustrated in FIG. 5 can be used to construct supergraphs of the query graph structure from the information source graph structures. This process starts in step 500 and proceeds to step 502 where a vertex in the information source graph structure is selected. Next, in step 504, this selected vertex is compared to the query graph structure to determine if the vertex is in the query graph structure. If it is, the process proceeds to step 510 where it is determined whether more vertices exist in the information source graph structure that have yet to be examined. If more vertices exist, the process proceeds back to step 502 in which the next vertex in the information source graph structure is selected. Alternatively, if, in step 504, it is determined that the vertex selected in the information source graph structure is not in the query graph structure, then the routine proceeds to step 506 in which a determination is made whether the selected vertex is connected to a vertex in the query graph structure.

If not, the routine proceeds to step 510 to determine whether unprocessed vertices exist. If the selected vertex is connected to a vertex in the query graph structure, information identifying the vertex is placed in the supergraph list in step 508 and the process proceeds to step 510. If additional vertices remain to be processed, then steps 502, 504, 506 and 508 are repeated. If no additional vertices remain to be processed, then the process finishes in step 512.

Figure 2:
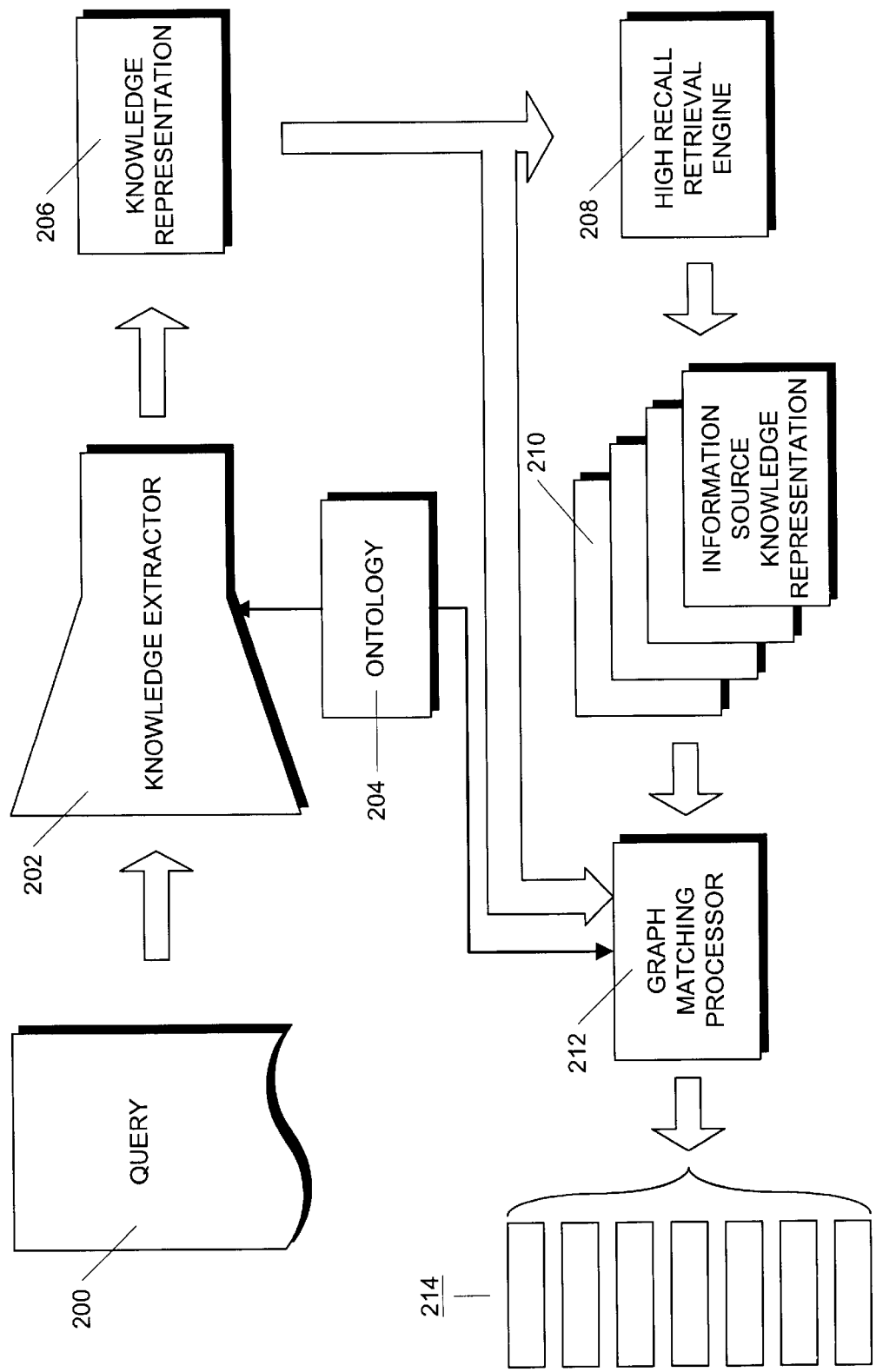
FIG. 2 is a schematic block diagram that illustrates the processing of a query to locate and classify information sources that respond to the query using graph structures.
Figure 3:
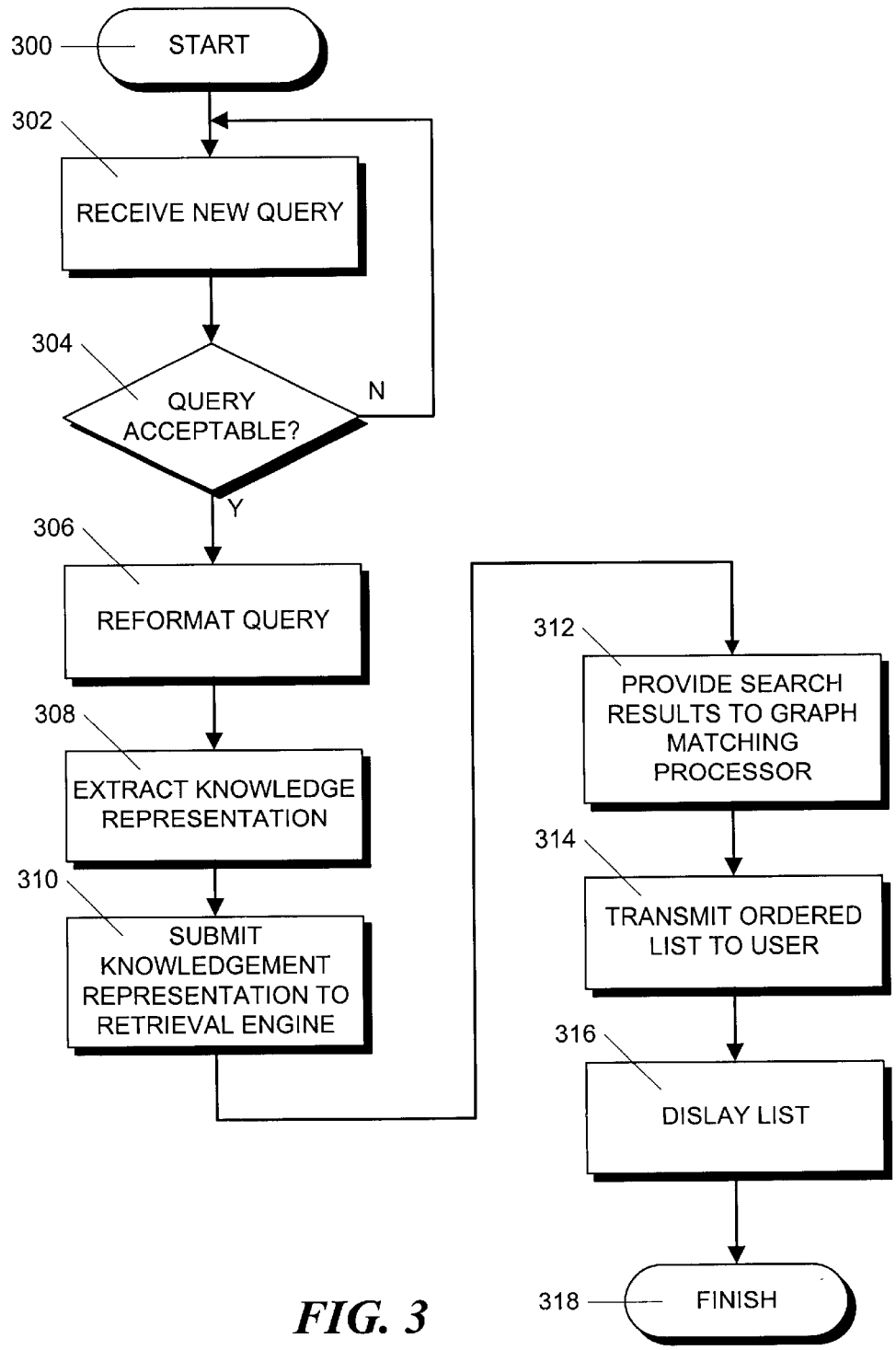
FIG. 3 is a flowchart that illustrates the steps performed in the query processing shown in FIG. 2.
Figure 6:
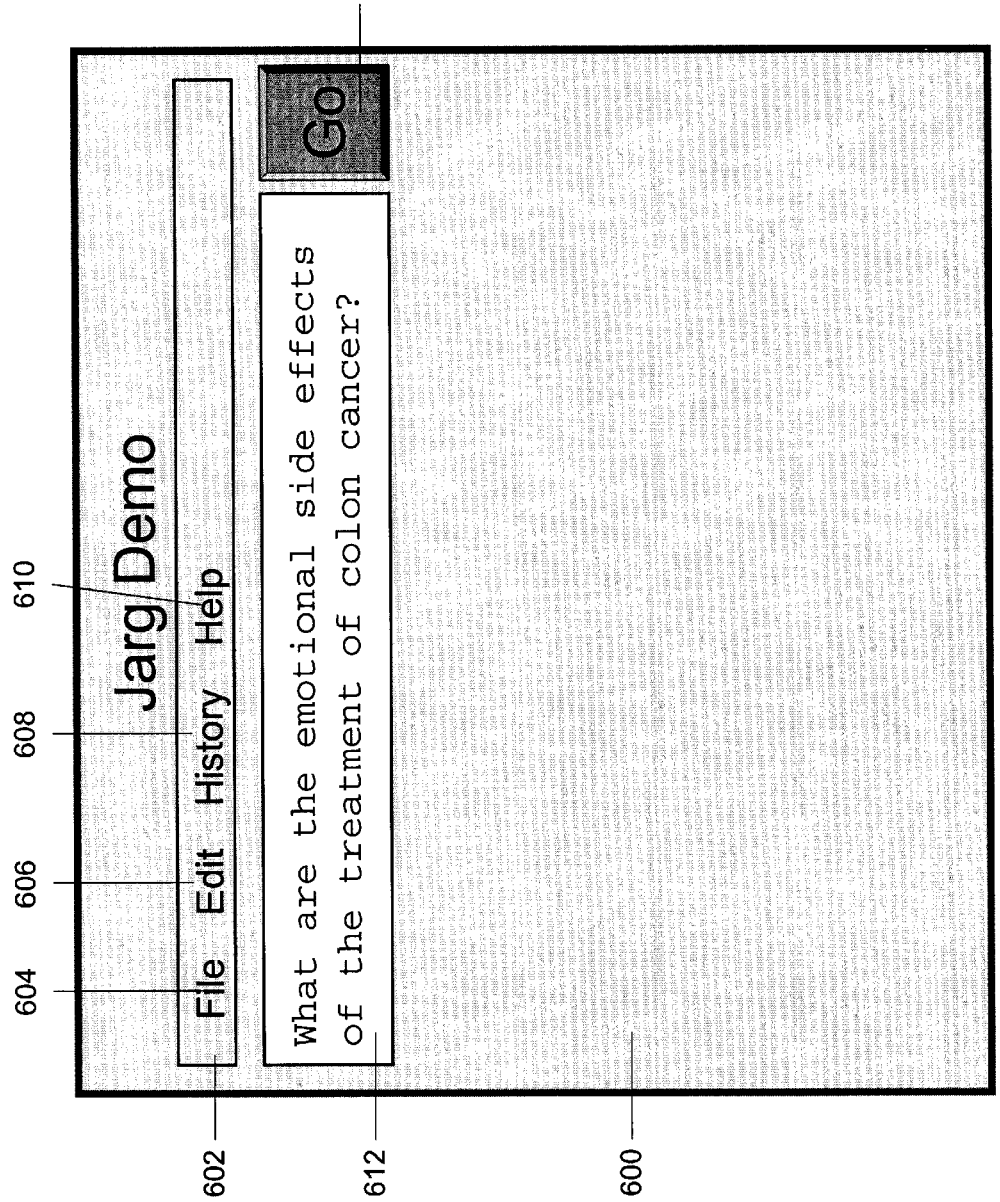
FIG. 6 is a screen shot of a sample display illustrating the processing of a query by means of graph structures which shows the query entered in a natural language.

In accordance with the principles of the invention, lists that result from the information source classification process illustrated in FIGS. 2 and 3 can be visually displayed to a user. Advantageously, the visual display facilitates relevance exploration and relevance testing of the retrieved information source documents. Although there are various conventional display mechanisms that are suitable for use with the inventive process, preferably a window-based graphic user interface is used. An illustrative graphic user interface is shown in FIG. 6. The graphic user interface consists of a window, or frame, 600 which contains a conventional menu 602 with menu selections such as "File" 604 that activates a drop down menu with selections that allow a user to open, close and save search files in a conventional manner. The "Edit" menu selection 606 displays a dropdown menu with selections that allow the query to be modified. The "History" menu selection 608 displays previous versions of the query and a "Help" menu selection 610 allows the user to select various help options in a conventional fashion.

In order to begin the information source classification process, a query is entered into text edit box 612 in a natural language. A push button 614 may be provided, which can be used to start the search and classification process as will hereinafter be described.

Figure 7:
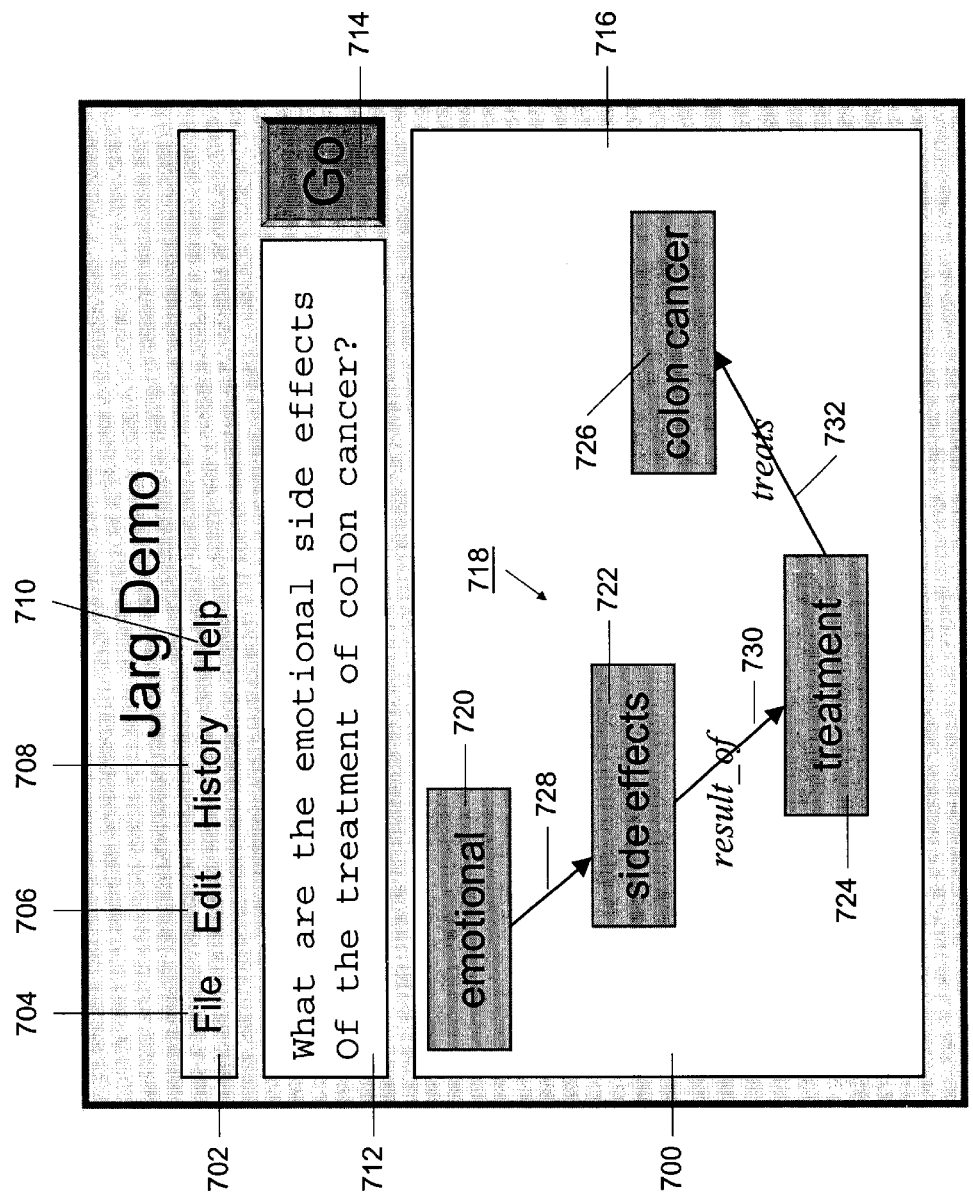
FIG. 7 is a screen shot of a sample display illustrating the processing of a query by means of graph structures which shows the query converted into a graph structure.

FIG. 7 illustrates the display of a graph structure that has been generated from the query that has been entered into text edit box 612. In FIG. 7 and FIGS. 8–12 that follow, elements that correspond to elements in FIG. 6 have been given corresponding numerals. For example, window 600 in FIG. 6 corresponds to window 700 in FIG. 7. The description of the elements in FIG. 6 also applies to corresponding elements in FIG. 7.

As shown in FIG. 7, the query in box 712 has been used to generate a graph structure 718, which is displayed at graphics display area 716 of the window 700. The graph structure 718 consists of four vertices 720, 722, 724 and 726. These vertices correspond to concepts, words and phrases that have been selected from the query by means of the knowledge extractor as described previously. The vertices 720–726 are connected together by edges 728, 730 and 732, which represent actions and/or results that are expressed in the query. As displayed in FIG. 7, the structure has been folded to fit it into the graphics display area 716. The graph structure 718 not only illustrates the major concepts expressed in the query, but also their relationships as indicated by the edges 728–732.

Figure 8:
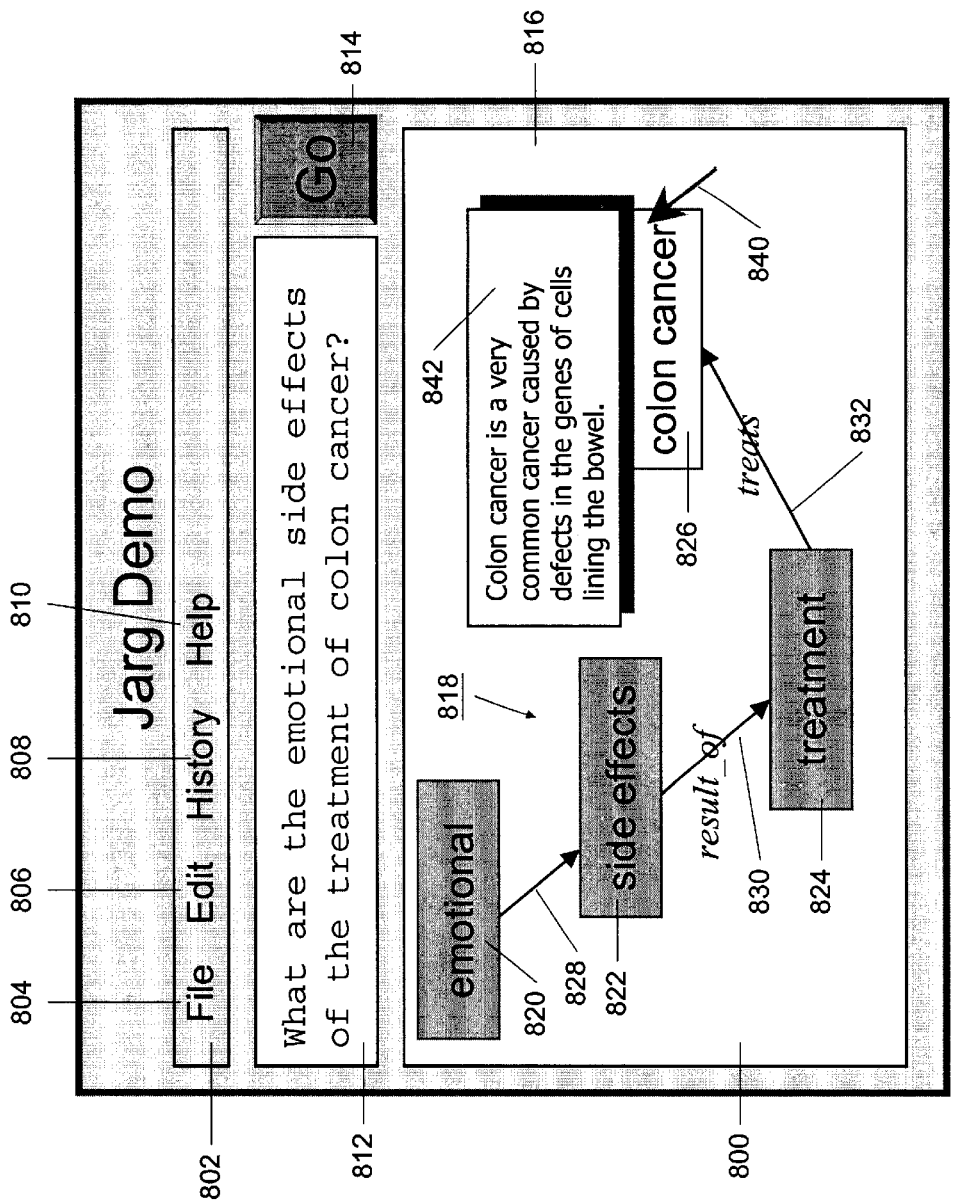
FIG. 8 is a screen shot of a sample display illustrating the processing of a query by means of graph structures, which shows how vertex definitions of the graph structure are displayed.

Once the graph structure 718 is displayed, the user may examine the definitions that are part of the ontology that was used to generate the graph structure. For example, as shown in FIG. 8, selecting vertex 726 by means of the cursor 840 causes a pop-up text box 842 to appear. The text box 842 contains the definition for the term in the vertex 826.

Figure 9:
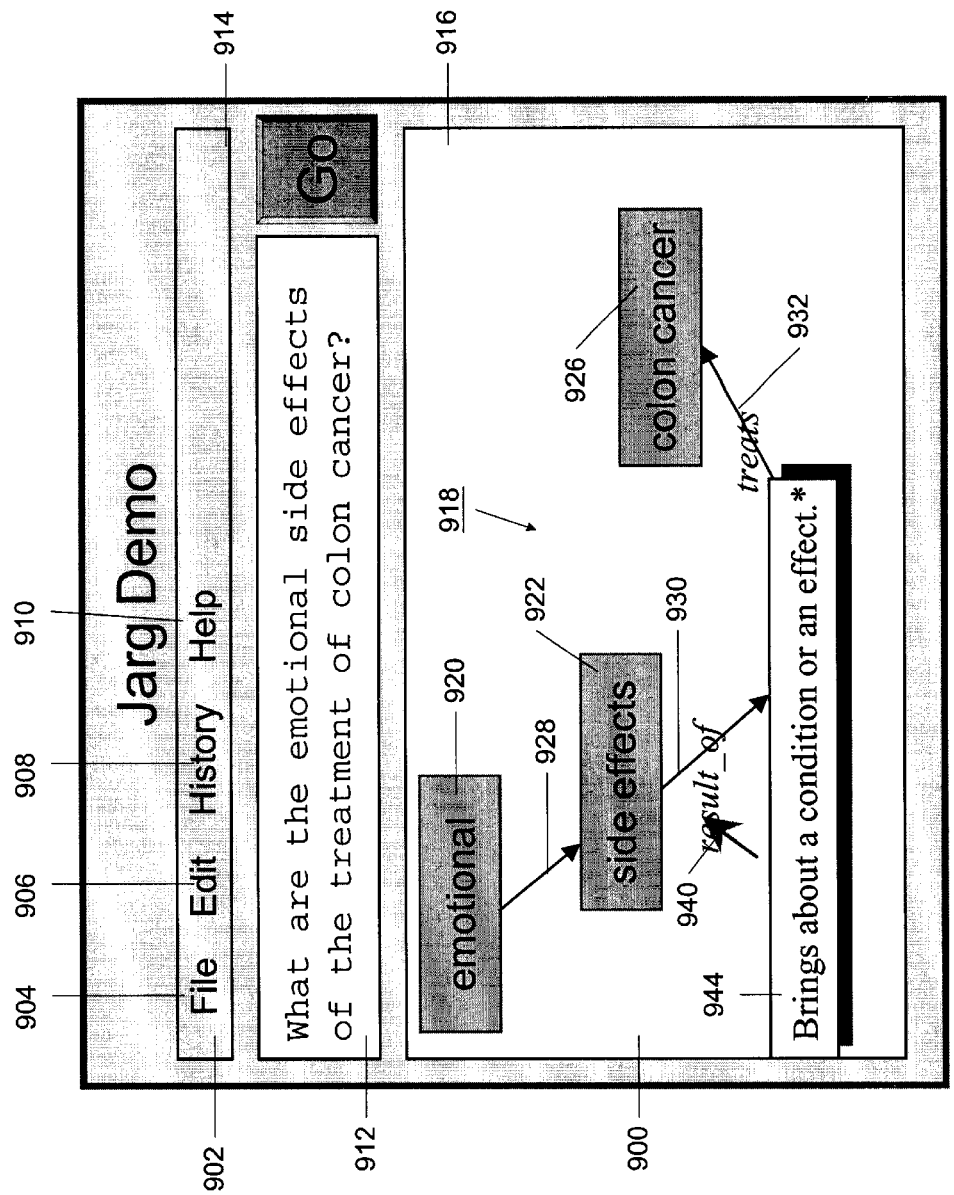
FIG. 9 is a screen shot of a sample display illustrating the processing of a query by means of graph structures, which shows how edge definitions of the graph structure are displayed.

In a similar manner, the user may examine the edge definitions that are part of the ontology that was used to generate the graph structure. For example, as shown in FIG. 9, selecting edge 930 by means of the cursor 940 causes a pop-up text box 944 to appear. The text box 944 contains the definition for the term represented by edge 930.

Figure 10:
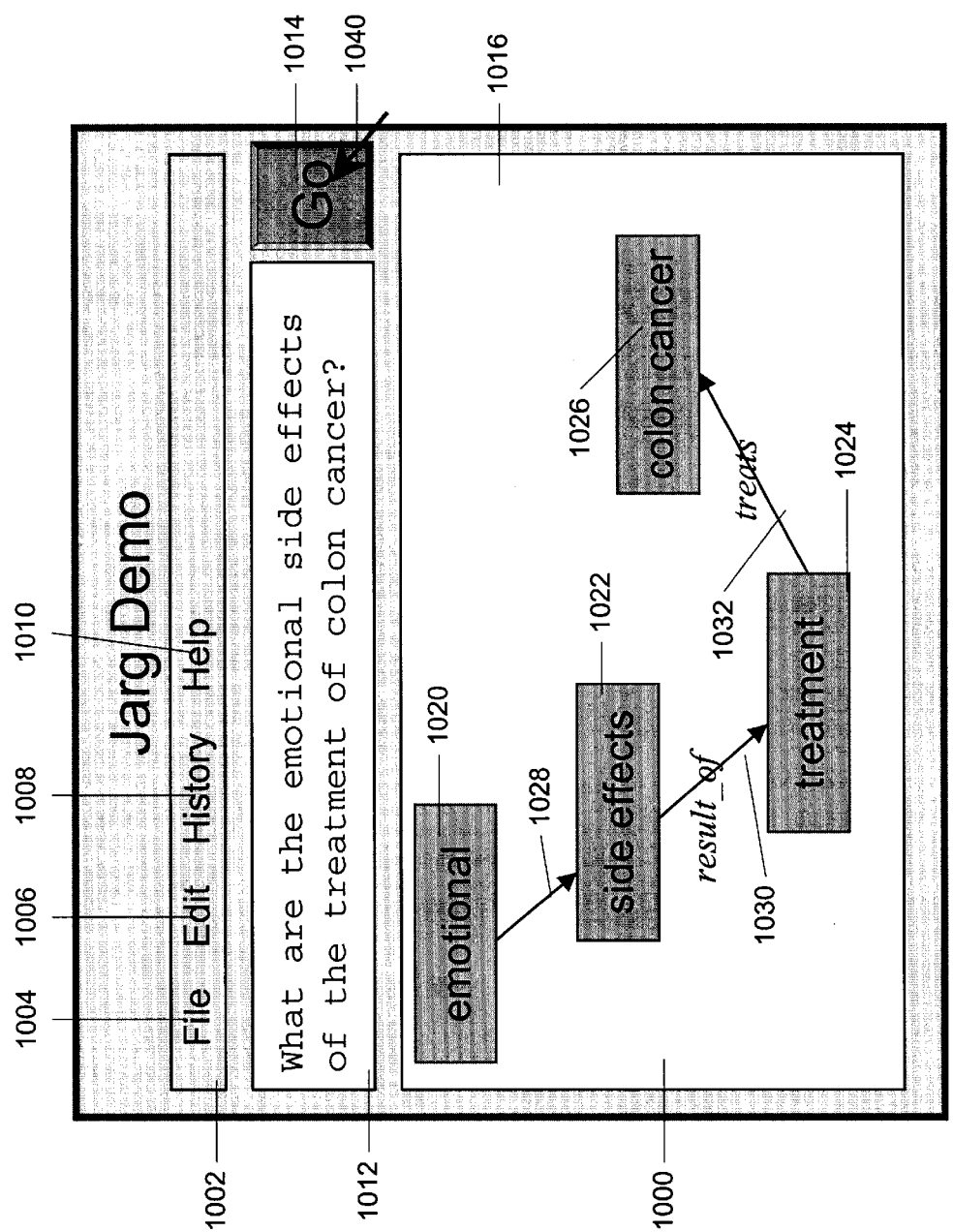
FIG. 10 is a screen shot of a sample display illustrating the processing of a query by means of graph structures which shows how processing of the query is initiated.

Once the query has been entered and modified by the user, the classification process is started by pressing a pushbutton on the interface. As shown in FIG. 10, the classification process is started by selecting button 1014 with cursor 1040.

Figure 11:
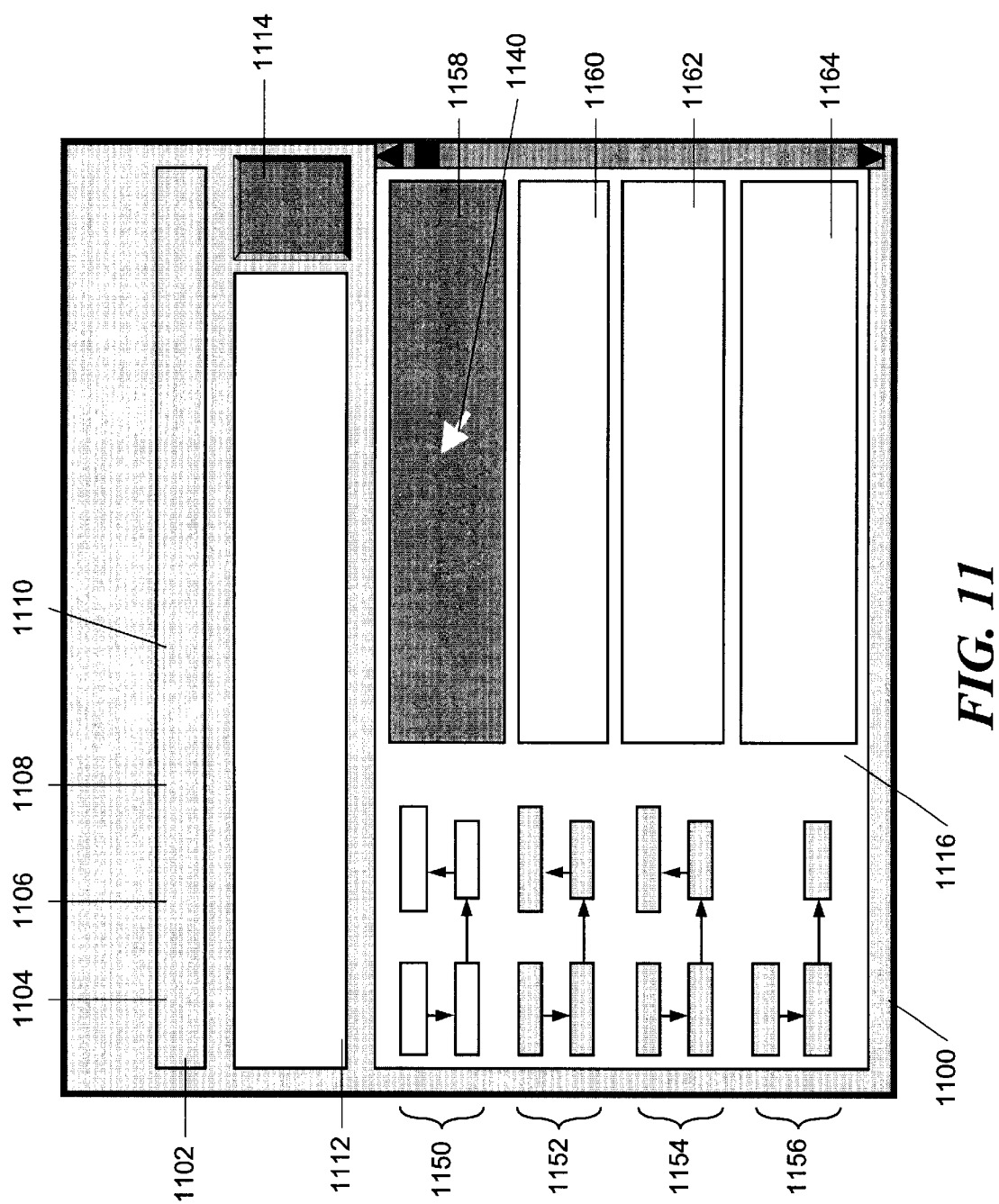
FIG. 11 is a screen shot of a sample display illustrating the processing of a query by means of graph structures which shows the results of the processing including the graph substructures discovered in the search and the documents in which the substructures were discovered.

FIG. 11 illustrates how the result of the search and classification are displayed to the user. The results may be displayed in a variety of manners that would be obvious to those skilled in the art. In the display shown in FIG. 11, a scrolling list of the hierarchical list structure described above is displayed in the graphics area 1116. Each "line" in this display corresponds to one source reference. The supergraph or subgraph structures associated with that reference are shown on the left side of the display and the information source title or identifying information is shown on the right.

For example, a subgraph structure 1150 is shown on the first line and the title of the source article 1152 from which the subgraph structure was derived is shown adjacent to the subgraph structure 1150. In a similar manner, additional subgraph structures 1152–1156 and titles 1160–1164 are displayed with the most relevant source article located at the top of the list. The titles can be selected by means of the cursor.

Figure 12:
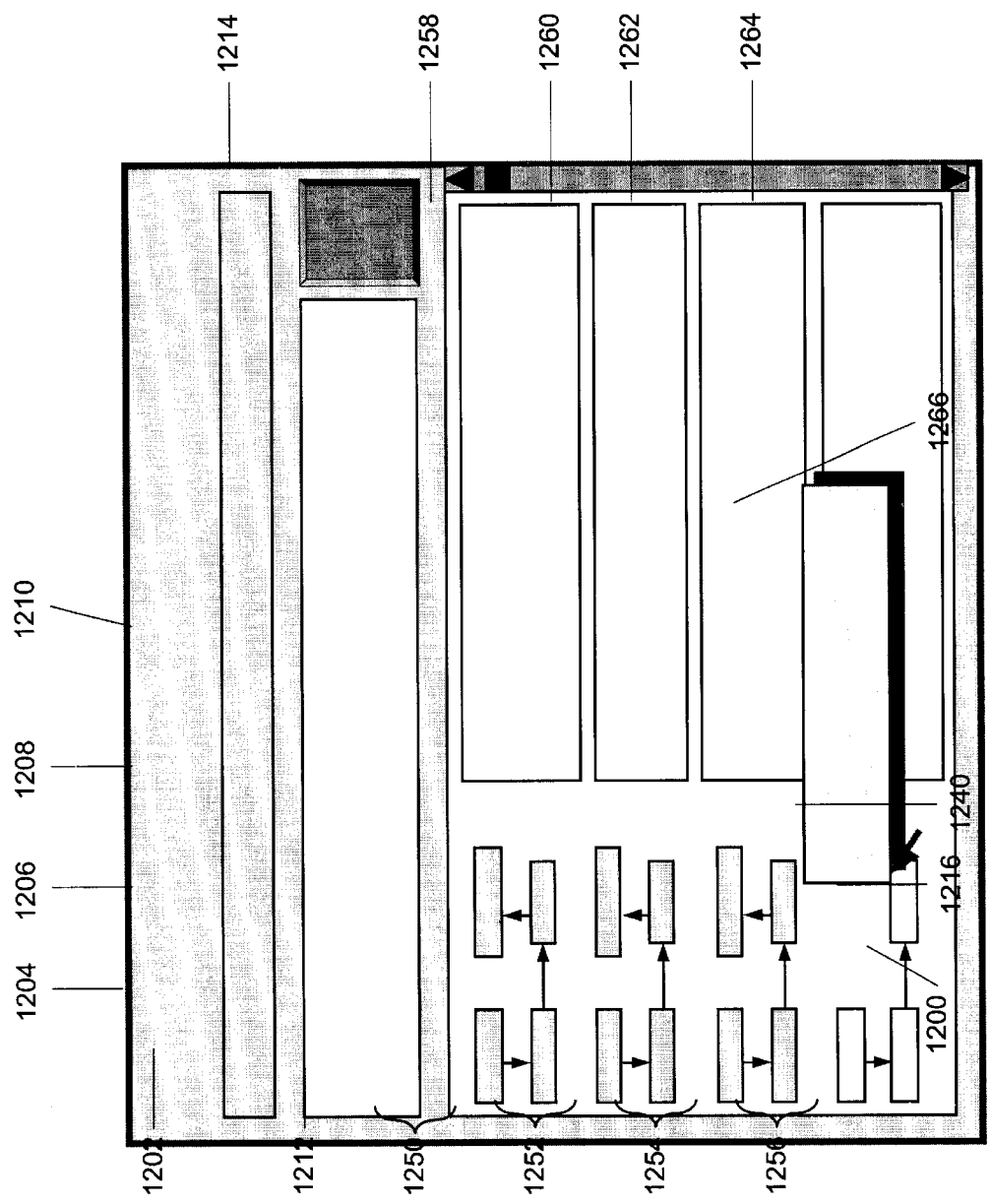
FIG. 12 is a screen shot of a sample display illustrating the processing of a query by means of graph structures which shows how additional information concerning the results of the processing are displayed.

Additional information concerning each information source can also be displayed. For example, as shown in FIG. 12, this additional information might be displayed as a pop-up window 1266 when the cursor 1240 is moved over the line associated with an information source.

Figure 13:
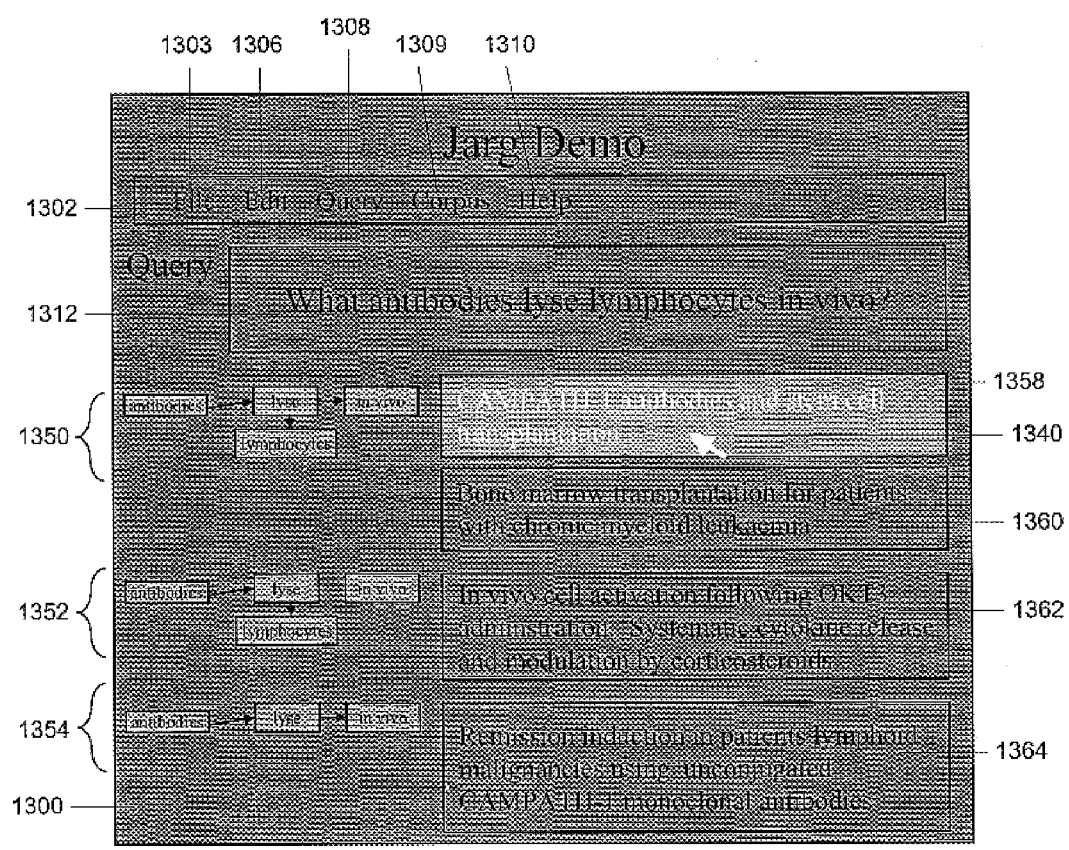
FIG. 13 is a screen shot of a sample display illustrating the processing of a query by means of graph structures which shows how relevance navigation and exploration is initiated.

As previously mentioned, information source titles can be selected in order to expand the content of the information source. This operation is illustrated in FIG. 13 in which title 1358 has been selected with the cursor 1340. The result is shown in FIG. 14 in which the content of the document has been expanded in scrolling area 1470.

Figure 14:
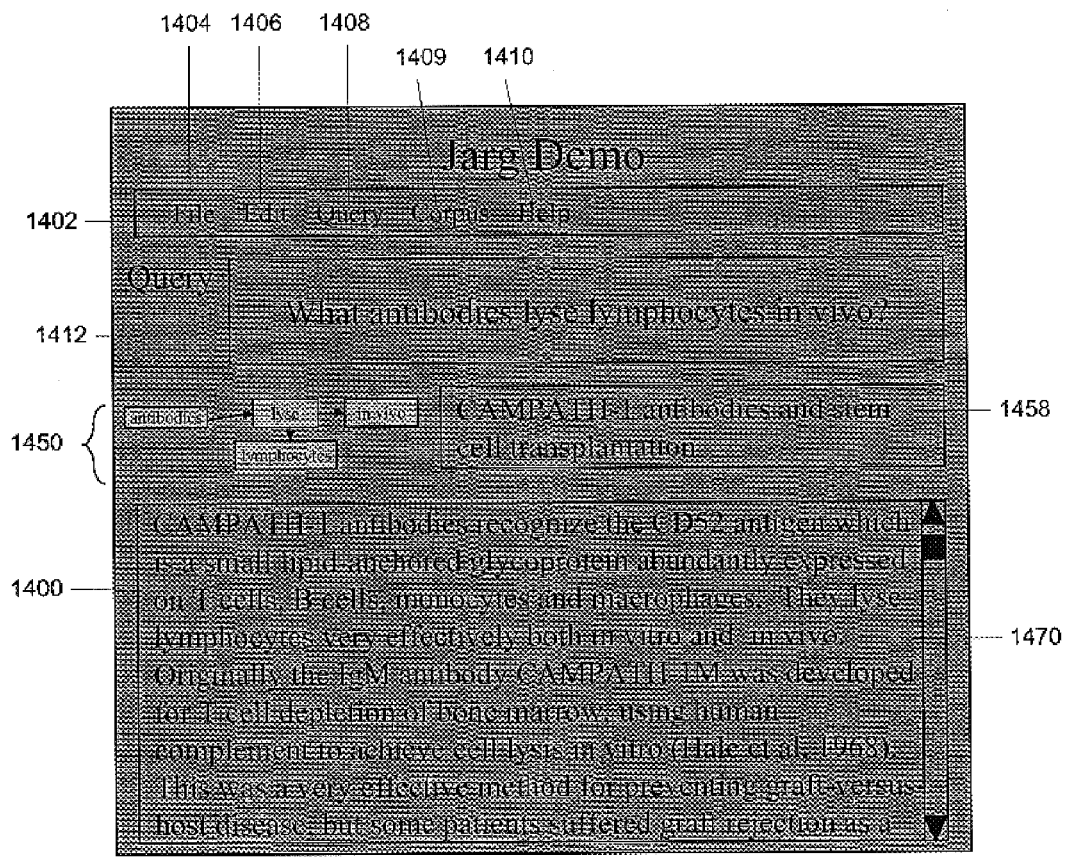
FIG. 14 is a screen shot of a sample display illustrating the processing of a query by means of graph structures, which shows an expanded view of a selected information source.
Figure 15:
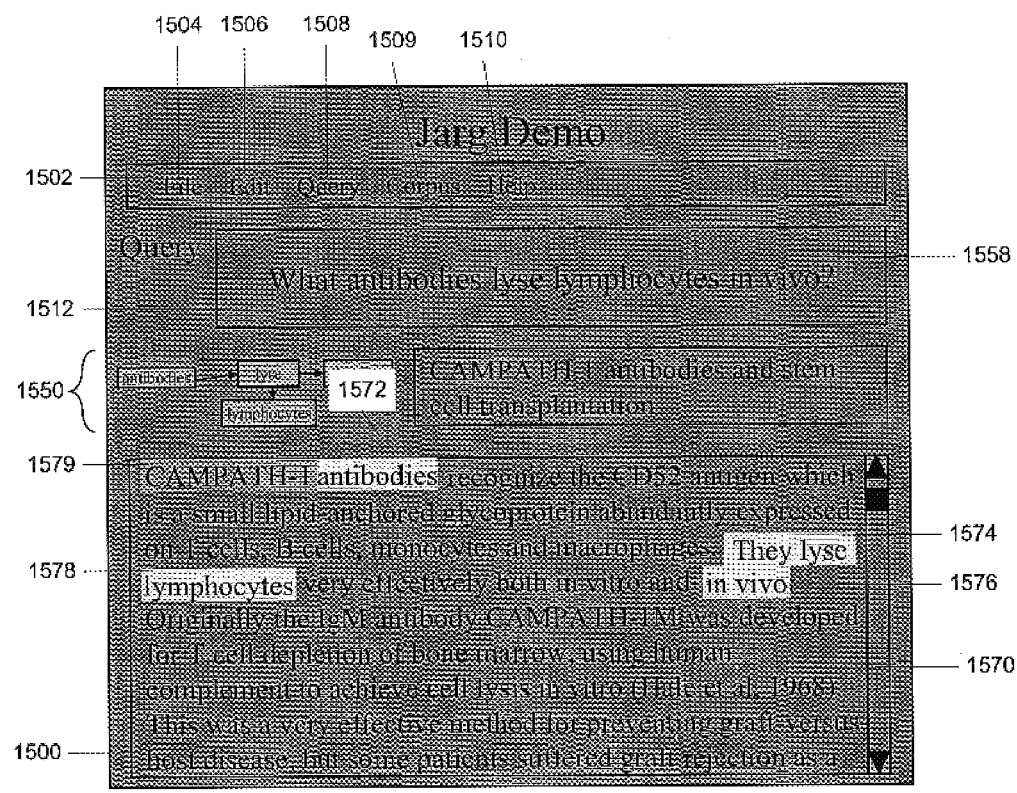
FIG. 15 is a screen shot of a sample display illustrating the processing of a query by means of graph structures in which items in the selected information source are highlighted to show correspondence with graph structure features.

In accordance with the principles of the invention, the display shown in FIG. 14 can also be advantageously used for knowledge exploration and knowledge navigation. For example FIG. 15 illustrates that the document content in area 1470 has been displayed with items 1572, 1574, 1576 and 1578 corresponding to graph structure vertices highlighted. In FIG. 15, this highlighting is shown as a color different from the background color, but those skilled in the art will realize that highlighting can be accomplished in other manners such as by using the same location on the screen for corresponding parts of the two views. The manner of highlighting is not important to the operation of the present invention.

In FIG. 15, a related item 1579 is also highlighted. Item 1579 does not have a corresponding vertex in graph structure 1550, but is related to item 1572 which does have a corresponding vertex. In this manner, the system highlights not only those items that have corresponding vertices, but also related items.

Figure 16:
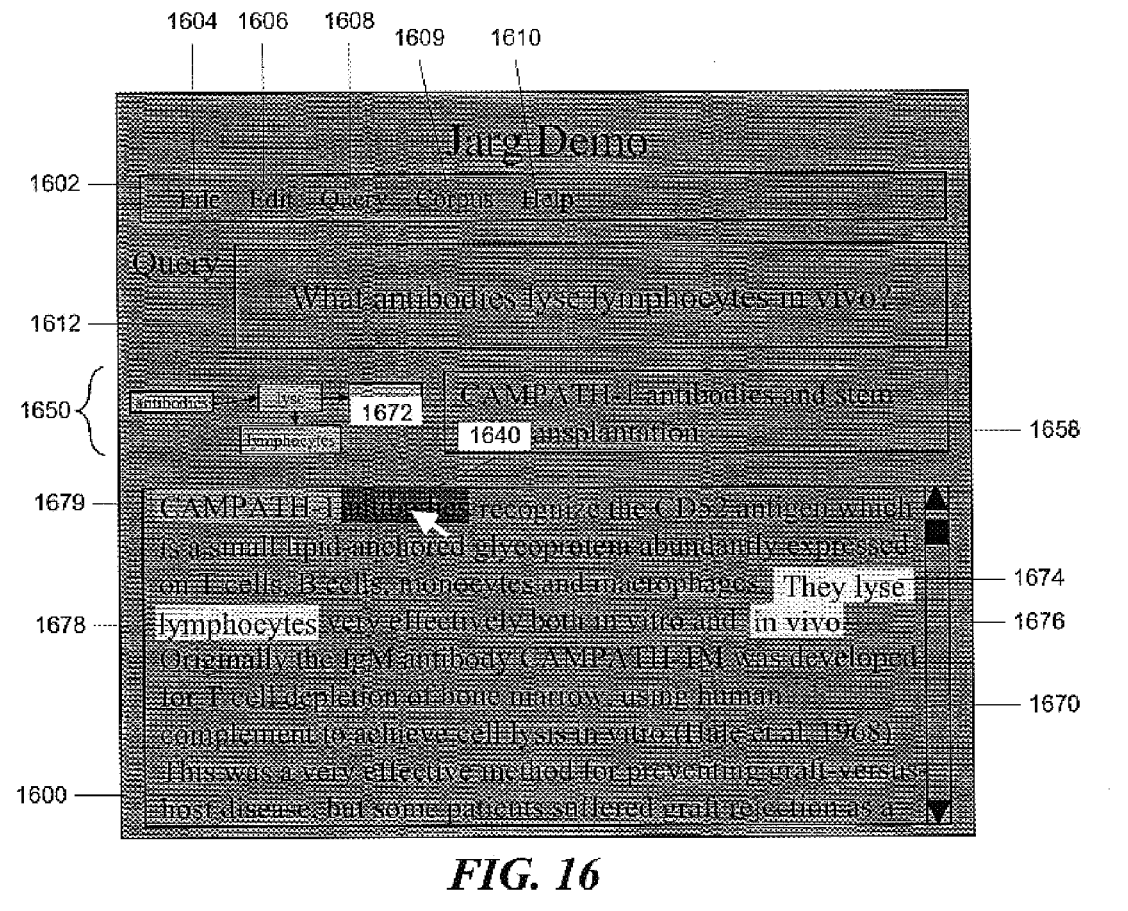
Figure 17:
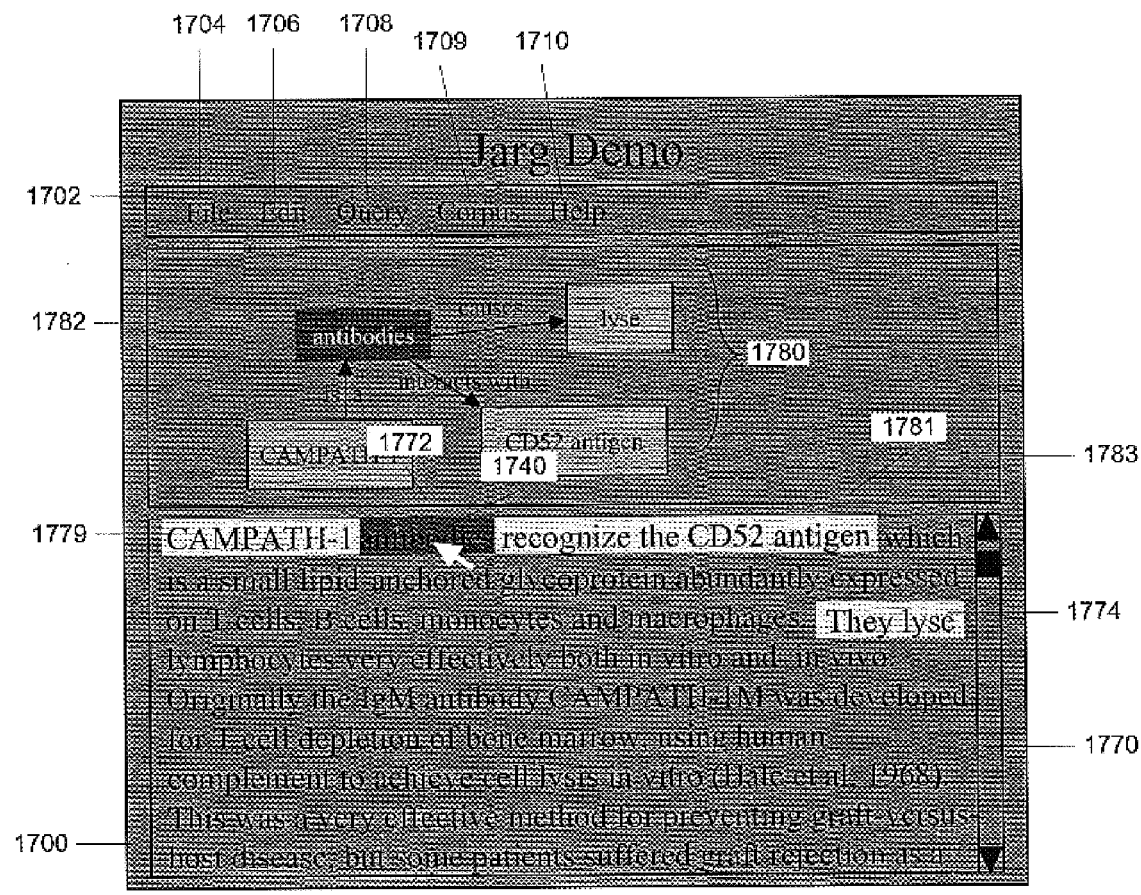
FIG. 17 is a screen shot of a sample display illustrating the processing of a query by means of graph structures which shows how corresponding vertices in the graph structure are highlighted when items are selected in the information source document.

Once the items have been highlighted, the user can successively select items of the information source to perform knowledge exploration of the information source. This is illustrated in FIGS. 16 and 17. In FIG. 16, item 1672 has been selected with the cursor 1640, causing the item to indicate the selection, for example by changing color. As shown in FIG. 17, the selection of an item 1772 in the information source document causes not only the item to be highlighted, but also related items to be highlighted. Thus, the related items 1779 and 1781 are also highlighted. The new corresponding graph structure 1780 is displayed above the content portion 1770 with the corresponding vertex 1782 to be highlighted. In this embodiment, the new graph structure replaces the query 1612 and the article title 1658 (FIG. 16) with a new graph area 1783. As with the highlighting of the information source items, this highlighting can be accomplished in a variety of ways known to those skilled in the art. The highlighting of related items allows the user to better understand the relationship of the items in the information source content.

Figure 18:
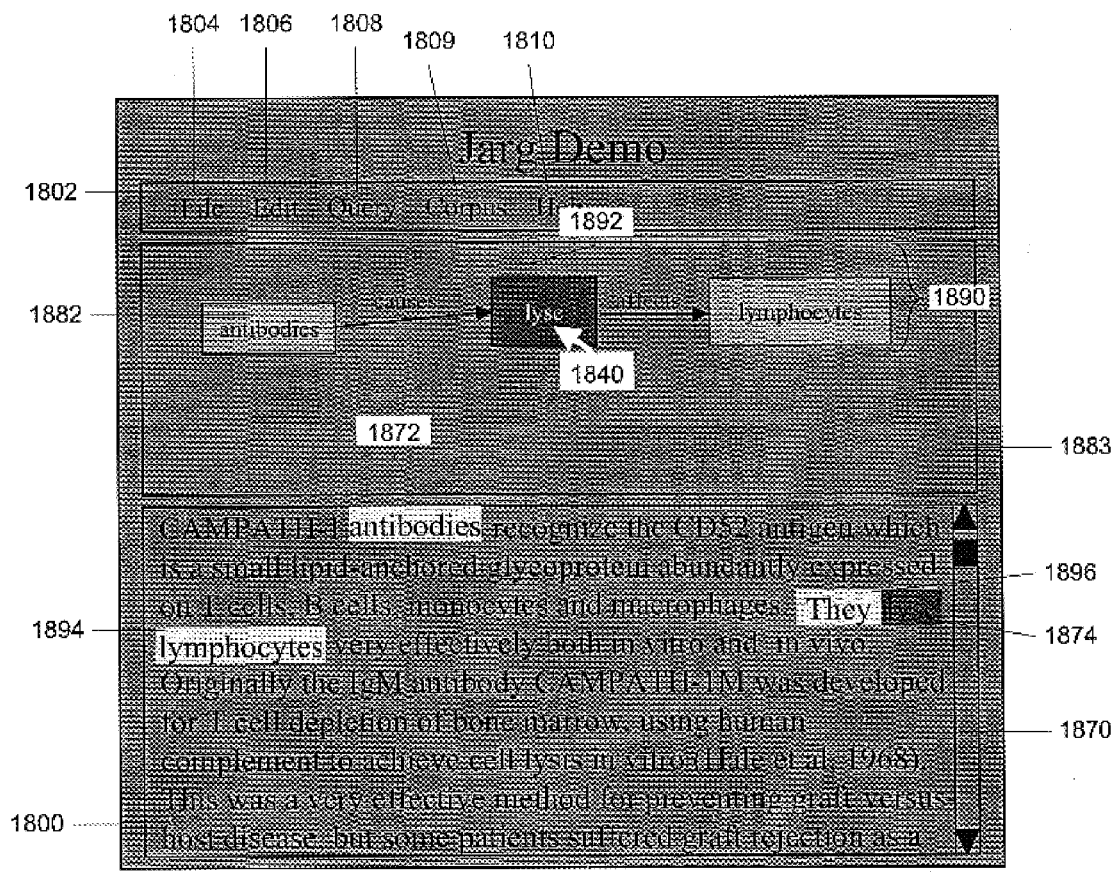
FIG. 18 is a screen shot of a sample display illustrating the processing of a query by means of graph structures which shows knowledge exploration in which corresponding vertices in the information source are highlighted when vertices are selected in the graph structure.

Alternatively, by selecting a succession of vertices in the graph structure, a searcher can perform knowledge navigation of the information source. This is shown in FIG. 18, in which a vertex 1892 has been selected in the graph structure 1650 (FIG. 16), in turn, causing the corresponding item 1874 to be highlighted in the document content section 1870. As with the selection of items in the document content, the selection of a vertex causes related vertices to also be selected in graph structure 1890 (a new graph structure 1890 reflecting these related items is also displayed in the graphic area 1883.) The corresponding items 1894 and 1896 are also highlighted in the document content 1870.

Once a vertex is located, a searcher can request the "next occurrence" of a graph structure in the information source. In this case, the computer system searches the current information source knowledge representation for another substructure that matches the query graph structure occurring at a subsequent point in the information source. If such a substructure is found, then the corresponding vertices of the information source are highlighted. Similarly, requesting a "previous occurrence" causes the system to search for a matching substructure occurring at a previous point in the information source.

Figure 19:
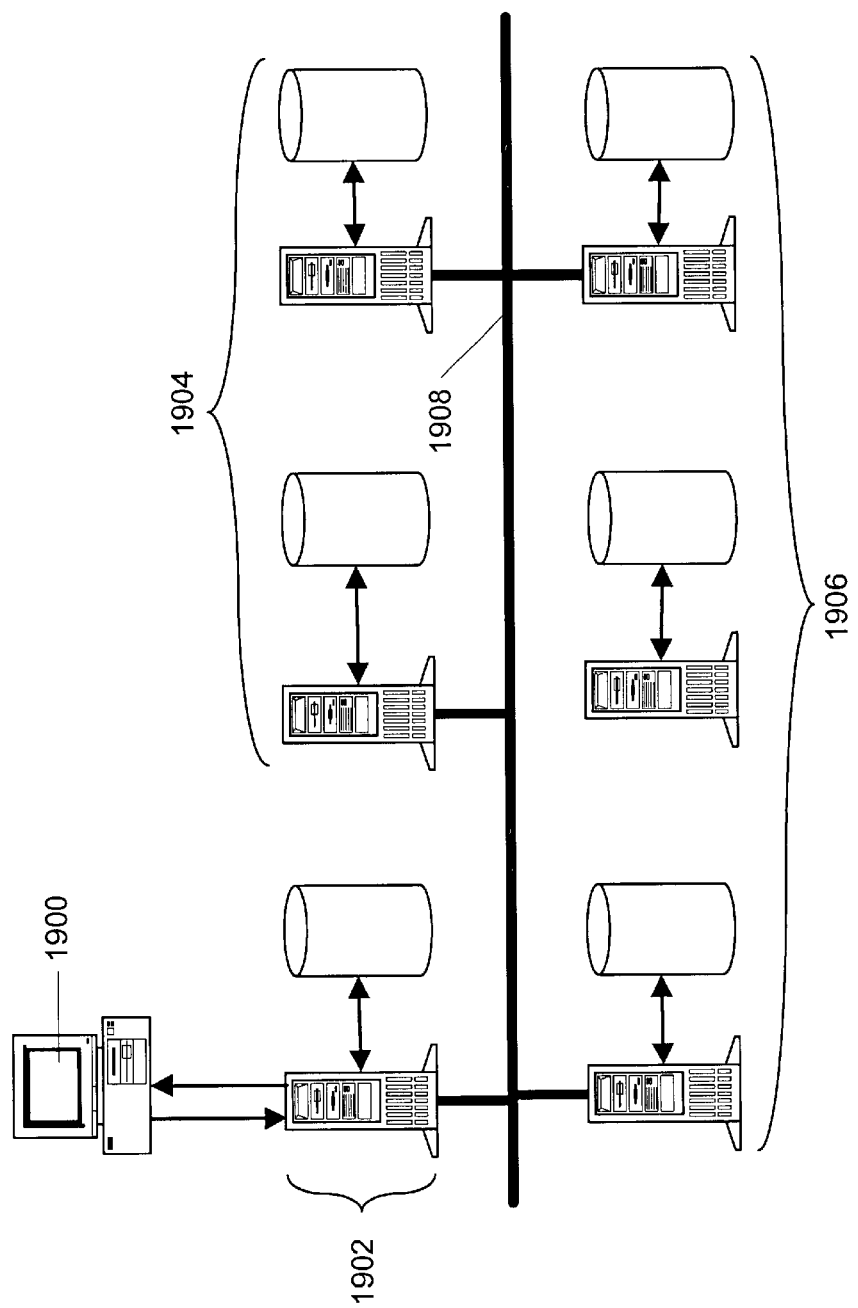
FIG. 19 is a block schematic diagram of an illustrative hardware implementation of the inventive classification system.

Referring to FIG. 19, in broad overview, one embodiment of a system of the invention includes a user computer 1900 which communicates with a classification engine comprised of computer nodes 1902, 1904 and 1906 through a network 1908. The individual computer nodes 1902–1906 may include local disks, or may, alternatively or additionally, obtain data from a network disk server (not shown.)

The computer nodes 1902–1906 of the classification engine may be of several types, including home node 1902 and index nodes 1904 and 1906. The nodes 1902–1906 of the classification engine need not represent distinct computers. In one embodiment, the classification engine consists of a single computer that takes on the roles of all home nodes 1902 and index nodes 1904–1906. In another embodiment, the classification engine consists of separate computers for each home node 1902 and index node 1904–1906. Those skilled in the art will realize many variations are possible which will still be within the scope and spirit of the present invention.

In order to process a query, a user transmits the query to the classification engine and home node 1902 receives the query. The home node 1902 is responsible for establishing the connection with the user computer 1900 to enable the user to transmit a query and to receive a response in an appropriate format. The home node 1902 may also be responsible for any authentication and administrative functionality, for example the acceptance function performed in step 304 of FIG. 3. In one embodiment, the home node 1902 is a World Wide Web server communicating with the user computer 1900 using the HTTP protocol.

After verifying that the query is acceptable, the home node 1902 performs any reformatting necessary to make the query compatible with the requirements of the search engine as set forth on step 306 of FIG. 3. The home node 1902 then transmits the query to the classification engine consisting of nodes 1904–1906 that, as previously discussed performs a search and classification of the information sources. This processing may involve the query being presented to a knowledge extractor that utilizes an ontology to extract a knowledge representation from the query. Alternatively, the user may transmit a knowledge representation directly to the classification engine without the step of knowledge extraction.

Upon receiving confirmation from the user that the knowledge representation is correct, the home node 1902 provides the query knowledge representation to a high recall retrieval engine which produces a collection of information source knowledge representations which collection is then transmitted to the graph matching processor along with the query knowledge representation. The results are then conveyed back to the home node 1902 and from there to the user computer 1900 for display as previously discussed.

In the preceding description, numerous specific details are set forth describing specific representations of data such as graphical displays and hierarchical displays, in order to provide a thorough understanding of the present invention. However, it will be apparent to one of ordinary skill in the art to which the present invention pertains, that the present invention may be practiced without the specific details disclosed herein. In other instances, well known system or processes have not been shown in detail in order not to obscure the present invention unnecessarily.

What is claimed is:

1. A method for navigating and exploring an information source located by matching a query knowledge representation to knowledge representations in the information source, the method comprising:

(a) visually displaying the query knowledge representation as a graph structure having features comprising vertices connected by edges;

(b) visually displaying the content of the information source in the vicinity of the graph structure; and (c) automatically highlighting items in the information source content that correspond to the vertices and edges of the graph structure.

2. The method according to claim 1 further comprising:

(d) highlighting a feature in the graph structure in response to a user selection; and (e) in response to the highlighting of a feature in the graph structure, highlighting an item in the information source content, which item corresponds to the selected feature.

3. The method according to claim 2 further comprising:

(f) in response to the highlighting of a feature in the graph structure, highlighting related features in the graph structure which are adjacent to the selected feature; and (g) in response to the highlighting of a feature in the graph structure, highlighting related items in the information source content, which related items correspond to the related features.

4. The method according to claim 1 further comprising:

(h) highlighting an item in the information source content in response to a user selection; and (i) in response to the highlighting of an item in the information source content, highlighting a feature in the graph structure, which feature corresponds to the selected item.

5. The method according to claim 4 further comprising:

(j) in response to the highlighting of an item in the information source content, highlighting related items in the information source content which are adjacent to the selected item; and (k) in response to the highlighting of an item in the information source content, highlighting related features in the graph structure, which related features correspond to the related items.

6. Apparatus for navigating and exploring an information source located by matching a query knowledge representation to knowledge representations in the information source, the apparatus comprising:

a visual display having an area for displaying the query knowledge representation as a graph structure having features comprising vertices connected by edges and an area for displaying the content of the information source in the vicinity of the graph structure; and a mechanism that is responsive to the display of the query knowledge representation for highlighting items in the information source content that correspond to the vertices and edges of the graph structure.

7. The apparatus according to claim 6 further comprising:

a mechanism that highlights a feature in the graph structure in response to a user selection with the user selection device; and a mechanism that is responsive to a user selection of a feature in the graph structure for highlighting an item in the information source content, which item corresponds to the selected feature.

8. The apparatus according to claim 7 further comprising:

a mechanism that is responsive to a user selection of a feature in the graph structure for highlighting related features in the graph structure which are adjacent to the selected feature; and a mechanism that is responsive to a user selection of a feature in the graph structure for highlighting related items in the information source content, which related items correspond to the related features.

9. The apparatus according to claim 6 further comprising:

a mechanism that highlights an item in the information source content in response to a user selection with the user selection device; and a mechanism that is responsive to a user selection of an item in the information source content for highlighting a feature in the graph structure, which feature corresponds to the selected item.

10. The apparatus according to claim 9 further comprising:

a mechanism that is responsive to a user selection of a feature in the graph structure for highlighting related items in the information source content which are adjacent to the selected item; and a mechanism that is responsive to a user selection of a feature in the graph structure for highlighting related features in the graph structure, which related features correspond to the related items.

11. A computer program product for navigating and exploring an information source located by matching a query knowledge representation to knowledge representations in the information source, the computer program product comprising a computer usable medium having computer readable program code thereon, including:

program code for visually displaying the query knowledge representation as a graph structure having features comprising vertices connected by edges;

program code for visually displaying the content of the information source in the vicinity of the graph structure; and program code for automatically highlighting items in the information source content that correspond to the vertices and edges of the graph structure.

12. A computer data signal embodied in a carrier wave for navigating and exploring an information source located by matching a query knowledge representation to knowledge representations in the information source, the computer data signal comprising:

program code for visually displaying the query knowledge representation as a graph structure having features comprising vertices connected by edges;

program code for visually displaying the content of the information source in the vicinity of the graph structure; and program code for automatically highlighting items in the information source content that correspond to the vertices and edges of the graph structure.

* * * * *